(12) United States Patent
Soehren et al.

(10) Patent No.: US 8,019,538 B2
(45) Date of Patent: Sep. 13, 2011

(54) SYSTEM AND METHOD FOR HIGH ACCURACY RELATIVE NAVIGATION

(75) Inventors: Wayne A. Soehren, Wayzata, MN (US); Christopher A. Lund, Otsego, MN (US); Lawrence C. Vallot, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 492 days.

(21) Appl. No.: 11/828,116

(22) Filed: Jul. 25, 2007

(65) Prior Publication Data

US 2009/0030608 A1    Jan. 29, 2009

(51) Int. Cl.
*G01C 21/16* (2006.01)

(52) U.S. Cl. ......... 701/213; 701/200; 701/220; 701/221

(58) Field of Classification Search .................. 701/200, 701/213–215, 220–221; 340/988; 342/357.06
See application file for complete search history.

(56) References Cited

U.S. PATENT DOCUMENTS

| | | |
|---|---|---|
| 4,470,562 A | 9/1984 | Hall et al. |
| 4,754,280 A | 6/1988 | Brown et al. |
| 4,924,749 A | 5/1990 | Beyer et al. |
| 5,117,360 A | 5/1992 | Hotz et al. |
| 5,672,872 A | 9/1997 | Wu et al. |
| 5,757,317 A | 5/1998 | Buchler et al. |
| 6,043,777 A | 3/2000 | Bergman et al. |
| 6,353,412 B1 | 3/2002 | Soliman |
| 6,417,802 B1 | 7/2002 | Diesel |
| 6,459,990 B1 * | 10/2002 | McCall et al. ................ 701/220 |
| 6,474,159 B1 | 11/2002 | Foxlin et al. |
| 6,489,922 B1 | 12/2002 | Lin et al. |
| 6,516,021 B1 | 2/2003 | Abbott et al. |
| 6,520,448 B1 | 2/2003 | Doty et al. |
| 6,577,921 B1 * | 6/2003 | Carson .......................... 700/214 |
| 6,639,553 B2 | 10/2003 | Lin et al. |
| 6,681,629 B2 | 1/2004 | Foxlin et al. |
| 6,859,690 B2 | 2/2005 | Asher et al. |
| RE40,801 E | 6/2009 | Smith |
| 7,646,336 B2 * | 1/2010 | Tan et al. .................. 342/357.31 |
| 2002/0109628 A1 | 8/2002 | Diesel |
| 2002/0147544 A1 | 10/2002 | Nicosia et al. |
| 2002/0180636 A1 | 12/2002 | Lin et al. |
| 2002/0194914 A1 | 12/2002 | Foxlin et al. |
| 2003/0146869 A1 | 8/2003 | Lin et al. |
| 2004/0030464 A1 | 2/2004 | Buchler et al. |
| 2004/0149036 A1 | 8/2004 | Foxlin et al. |
| 2005/0060092 A1 | 3/2005 | Hablani |

FOREIGN PATENT DOCUMENTS

| | | |
|---|---|---|
| WO | WO 98/57190 | 12/1998 |
| WO | 01/80736 | 11/2001 |
| WO | 02/35183 | 5/2002 |
| WO | 2004/046748 | 6/2004 |
| WO | 2004/070318 | 8/2004 |

* cited by examiner

*Primary Examiner* — Yonel Beaulieu
(74) *Attorney, Agent, or Firm* — Fogg & Powers LLC

(57) ABSTRACT

A relative navigation system and method are disclosed. The relative navigation system includes a first sensor unit responsive to a motion of a first position, a second sensor unit responsive to a motion of a second position, and a first processing unit associated with at least one of the first sensor unit and the second sensor unit and communicatively coupled to the first sensor unit and the second sensor unit. The first processing unit is configured to generate relative navigation solution information associated with first sensor unit information and second sensor unit information.

20 Claims, 16 Drawing Sheets

SYSTEM AND METHOD FOR HIGH ACCURACY RELATIVE NAVIGATION

GOVERNMENT LICENSE RIGHTS

The U.S. Government may have certain rights in the present invention as provided for by the terms of Government Contract #F33615-03-C-1479 awarded by USAF/AFRL.

RELATED APPLICATION(S)

The present application is related by subject matter to commonly-assigned U.S. patent application Ser. No. 11/341,812 entitled "METHOD AND APPARATUS FOR HIGH ACCURACY RELATIVE MOTION DETERMINATION USING INERTIAL SENSORS", filed on Jan. 27, 2006, and issued on Nov. 30, 2010 as U.S. Pat. No. 7,844,397, which is incorporated herein by reference in its entirety.

FIELD OF THE INVENTION

The invention relates to the navigation field, and more particularly, but not exclusively, to a system and method for high accuracy relative navigation using, for example, inertial sensors.

BACKGROUND OF THE INVENTION

Inertial measurement systems are used to determine the position, velocity, and attitude of an object. Typically, an inertial sensor suite is composed of a triad of accelerometers that measure the non-gravitational acceleration vector of an object with respect to an inertial frame and a triad of gyroscopes that measure the angular velocity vector of an object with respect to the inertial frame. Processing the outputs of the inertial sensors through a set of strapdown navigation algorithms yields the complete kinematic state of the object. State-of-the-art commercially available inertial navigation systems can provide position accuracies on the order of one nautical mile per hour position error growth rate.

In some existing applications, it is desirable to know the position and/or velocity of objects relative to each other, rather than in an absolute sense. However, in some other applications, it may be desirable to know both the relative and absolute positions and/or velocities of objects relative to each other. For example, an application may determine the absolute position of point B using the combination of the absolute position of point A and the relative position between points A and B. In any event, the accuracy desired in many of these applications is on the order of a centimeter, rather than a nautical mile.

Two exemplary applications that require very accurate knowledge of the relative position and/or velocity of objects include radiation-emitter location determination systems and Ultra Tightly Coupled (UTC) Inertial Navigation System (INS)/Global Positioning System (GPS). These types of systems include a master inertial sensing unit in communication with at least one remote slave inertial sensing unit that is co-located with an antenna. The instantaneous relative position and relative velocity vectors between the master and slave inertial sensor units are required to satisfy the stringent accuracy requirements placed on these systems. The nominal baseline vector between the master and slave inertial sensor units is known in such systems. However, the slave inertial sensor system and master inertial sensor system are often moving relative to each other due to vibration and flexure of the vehicle, so the baseline solution is in reality only approximately known.

In an exemplary application, one of the inertial sensor systems is located on the wing of an aircraft, and the other inertial sensor system is located on the body of the aircraft. In flight, the aircraft undergoes flexure effects at one or more prominent resonant frequencies that cause the relative position, velocity and attitude vectors between the master and slave Inertial Measurement Units (IMUs) to deviate from the baseline. In the case where the IMU is located close to the wingtip of a large aircraft, the amount of sensor position offset from the baseline can be greater than one meter. Also, in this exemplary application, an antenna co-located with the IMU responds to the same large flexure motion. Consequently, unless the relative position, velocity and attitude vectors can be corrected for the flexure motion, other onboard systems that utilize the signal from the antenna may experience degraded performance.

The above-described related patent application describes an exemplary embodiment for a novel approach that can be used to determine relative motions of structural elements at centimeter-level accuracies, in order to provide suitable relative navigation solutions. In order to obtain these solutions, the relative and master navigation processing is executed in a single processor. However, such an implementation would be very difficult in an application requiring a plurality of relative navigation solutions, such as, for example, an application including a plurality of Electronic Surveillance Measure (ESM) antennas and/or GPS antennas located on a single platform.

In this regard, many of today's aircraft have numerous navigation-related sensors located at different points on the aircraft. In many applications, it is often necessary to know where each of these sensors is relative to another point on the aircraft. Current navigation solutions take the relative positions to be static values based on measurements taken on the ground. Unfortunately, the relative positions of the sensors involved continuously change while the aircraft is in flight, which corrupts the outputs of interest from these sensors. Therefore, a pressing need exists for an approach that can be used to calculate relative navigation solutions in real-time using, for example, data from inertial sensors located at the points of interest.

SUMMARY OF THE INVENTION

In a first example embodiment, a relative navigation system is provided. The relative navigation system includes a first sensor unit responsive to a motion of a first position, a second sensor unit responsive to a motion of a second position, and a first processing unit associated with at least one of the first sensor unit and the second sensor unit and communicatively coupled to the first sensor unit and the second sensor unit, wherein the first processing unit is configured to generate relative navigation solution information associated with first sensor unit information and second sensor unit information.

In a second example embodiment, a relative navigation system is provided. The relative navigation system includes a first inertial measurement unit located at a first wing of a craft, a second inertial measurement unit located at a main body or a second wing of the craft, and a first processing unit substantially co-located with the first inertial measurement unit and communicatively coupled to the first inertial measurement unit and the second inertial measurement unit, the first processing unit including at least a first relative navigation algorithm for generating a first relative navigation solution.

In a third example embodiment, a relative navigation method is provided. The relative navigation method includes the steps of co-locating a first sensor unit and a relative navigation processing unit at a first location on a vehicle, positioning a second sensor unit at a second location on the vehicle, receiving first sensor information from the first sensor unit, receiving second sensor information from the second sensor unit, generating compensated sensor information from the received first sensor information and second sensor information, generating relative navigation solution information associated as a function of the compensated sensor information, receiving baseline information, and generating corrective feedback information as a function of at least the relative navigation solution information and the baseline information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT(S)

Essentially, exemplary embodiments are provided for a system and method that can be used to determine relative positions in real-time for high accuracy relative navigation, in which a processor unit and IMU may be arranged at each antenna or point (e.g., "node") on the platform for which a relative navigation solution is desired. For one or more exemplary embodiments, data from a high performance master navigator system may be distributed to each of these nodes, and a relative navigation solution for each node may be computed at that node. The relative navigation solution for each node may be transmitted in a broadcast mode and/or conveyed directly by wireless or wired techniques to specific equipment for which a relative navigation solution is desired. A relative navigation solution between nodes may be computed by suitably processing the individual nodes' inertial sensor measurements and reference baseline data. For some exemplary embodiments, a system or method for relative navigation solutions may be implemented using a variant of a BG1930 IMU/processing unit produced by Honeywell International, Inc. (e.g., including or excluding an embedded GPS receiver), and an H764 Embedded GPS Inertial (EGI) Navigation System for a master navigation unit (also produced by Honeywell International, Inc.), whereby both such units may be suitably modified to perform the specific relative navigation applications desired.

Figure 1:
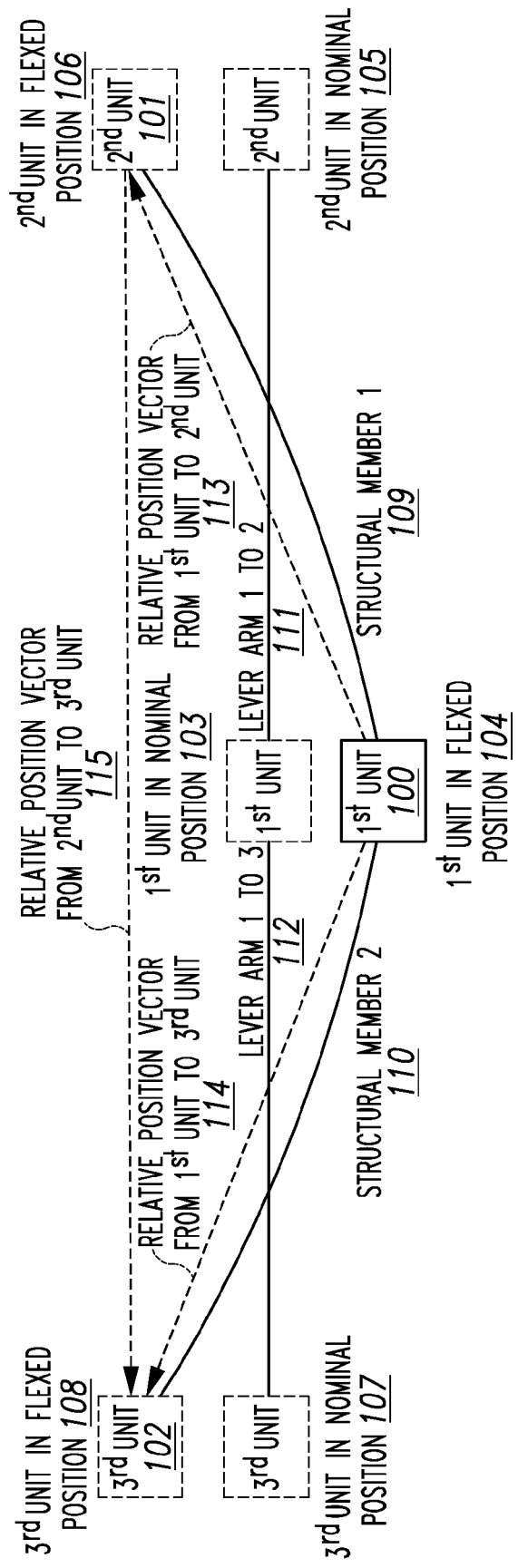
FIG. 1 depicts an exemplary configuration of three sets of sensors or IMUs positioned at different locations with respect to each other on a semi-flexible structure.

With reference now to the figures, FIG. 1 depicts an exemplary configuration of three sets of inertial sensors or IMUs 100, 101 and 102 positioned at different locations with respect to each other on a semi-flexible structure, which illustrates the system implementation and software processing concepts for achieving very high accuracy relative navigation solutions that were disclosed in the above-described related patent application. These concepts are reiterated here in order to clarify and distinguish the present invention and the exemplary embodiments or implementations to be described herein. In this regard, a "semi-flexible structure" is defined as a structure designed to be substantially rigid with some flexure under some conditions. Airborne vehicles and tall buildings are examples of semi-flexible structures. For example, an airplane is substantially rigid, but the wings of the airplane flex when it is operational. A sky scraper bends slightly when subjected to strong winds. In one implementation of the exemplary configuration depicted in FIG. 1, the three IMUs 100, 101 and 102 are located on a flexible structure that is less rigid than the exemplary semi-flexible structures. In a second implementation, one of the three IMUs is located on a first semi-flexible structure, and the other two IMUs are located on a second semi-flexible structure. In yet another implementation, one of the three IMUs is located on a flexible structure, and the other two IMUs are located on a semi-flexible structure.

In the exemplary configuration depicted in FIG. 1, the three IMUs (or sensors) 100, 101 and 102 are located on a structure or vehicle at different positions 104, 106 and 108, respectively. For illustrative purposes, the three IMUs (or sensors)

100, 101 and 102 are also referred to as "first unit 100", "second unit 101" and "third unit 102", respectively. In one exemplary implementation of this configuration, the structure or vehicle is a semi-flexible structure. In another exemplary implementation, the structure or vehicle is a flexible structure. The first unit 100 is responsive to the motion of the first position 103 located on the structural members 109 and/or 110, the second unit 101 is responsive to the motion of the second position 105 on the structural member 109, and the third unit 102 is responsive to the motion of the third position 107 on the structural member 110.

As shown in FIG. 1, the first IMU 100 has moved to first position 104, the second IMU 101 has moved to second position 106, and the third IMU 102 has moved to third position 108 due to flexure of the supporting structure or vehicle. For greater generality, a first structural element 109 and a second structural element 110 are depicted in FIG. 1. In one exemplary implementation, the first structural member 109 may be the right wing of an aircraft, and the second structural member 110 may be the left wing of the aircraft. In another exemplary implementation, the first structural member 109 and the second structural member 110 may be different parts of a single structure, such as, for example, the fuselage of an aircraft. In yet another exemplary implementation, the first structural member 109 and the second structural member 110 also may be different parts of a single structure, such as, for example, a bridge or building being monitored for structural integrity.

When in their nominal (unflexed) positions 103, 105 and 107, the three IMUs 100, 101 and 102 are located relative to each other by nominal lever-arms 111 and 112 that both have a known length. The term "nominal positions" defines any selected set of positions for the IMUs in a given system. As shown in FIG. 1, the nominal positions include the set of positions of the three IMUs 100, 101 and 102 on a flexible or semi-flexible structure that is in an unflexed state. Other nominal positions are possible.

In the development of the relative navigation system concept depicted in the above-described related patent application, the known nominal lever-arms 111 and 112 are utilized as reference points to a closed-loop error-control scheme. In that exemplary case, the flexure motion results in a zero-mean oscillatory motion for each of the three IMUs 100, 101 and 102 about their nominal positions 103, 105 and 107, respectively. However, when in their non-nominal (flexed) positions, the three IMUs 100, 101 and 102 are located relative to each other by relative position, velocity and attitude vectors 113 and 114. As such, the term "non-nominal position" is also referred to therein as "flexed position". Thus, as used therein, the term "non-nominal positions" may define any set of positions for the IMUs in a given system, which are not in the nominal positions as defined above.

The relative position vector 113 between first unit 100 and second unit 101 represents the vector displacement between a master system (e.g., first unit 100) and a slave system (e.g., second unit 101). Similarly, the relative position vector 114 between first unit 100 and third unit 102 represents the vector displacement between the master system (e.g., first unit 100) and a second slave system (e.g., third unit 102). The relative position vector 115 between second unit 101 and third unit 102 represents the vector displacement between the first and second slave systems. In some applications, it is desirable to have knowledge of the position vector of the second slave unit relative to the first slave unit. This knowledge can be deduced by algebraically subtracting the relative position vector 113 of second unit 101 relative to first unit 100 from the relative position vector 114 of third unit 102 relative to first unit 100.

Figure 2:
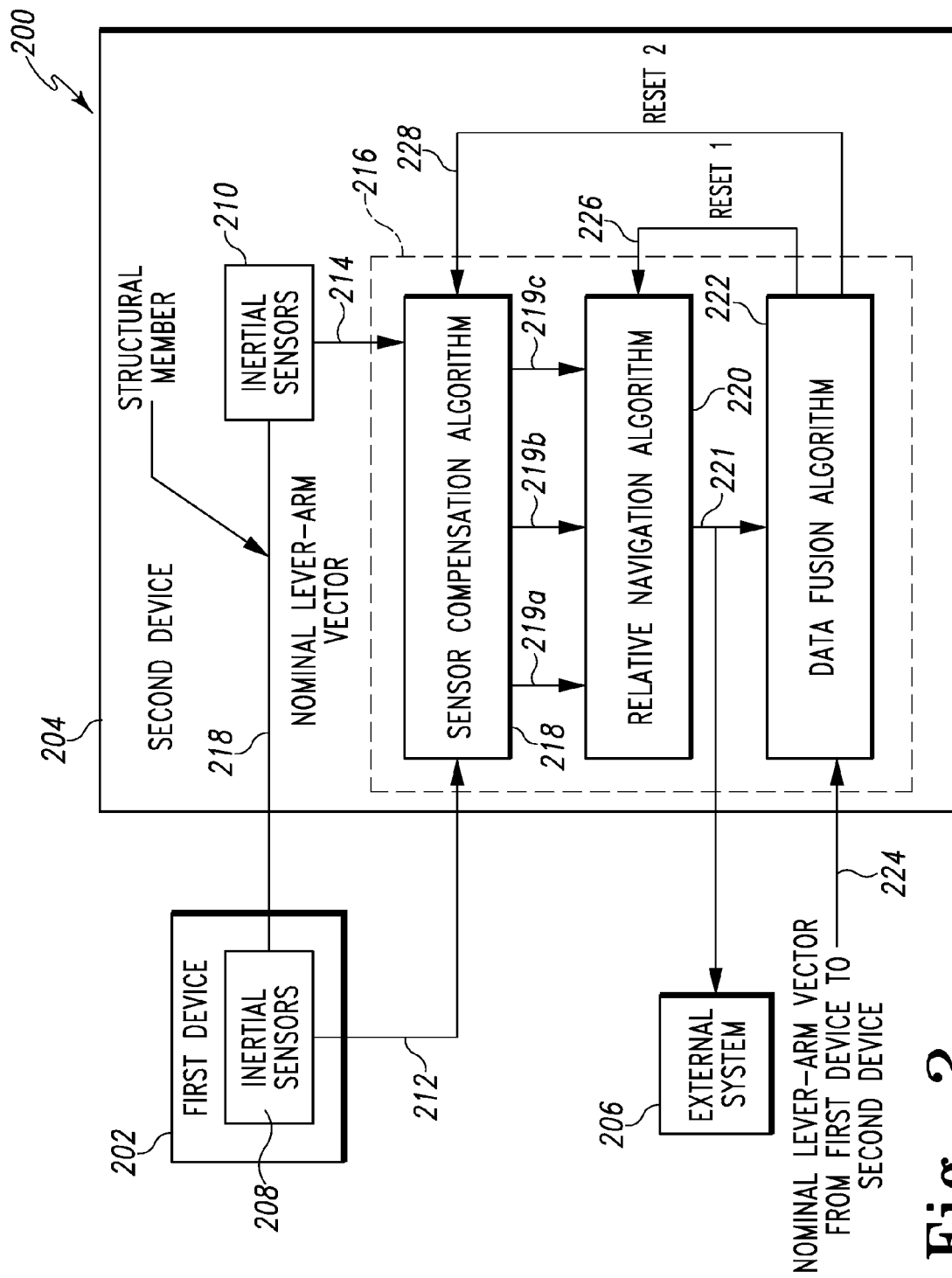
FIG. 2 is a block diagram depicting an exemplary configuration for a system that incorporates two sets of sensors or IMUs, which can be used to implement one or more embodiments of the present invention.

FIG. 2 is a block diagram depicting an exemplary configuration for a system 200 that incorporates two IMUs (or, for example, suites or sets of inertial sensors), which can be used to implement one or more embodiments of the present invention. In one exemplary embodiment, system 200 may be referred to as a "relative navigation system". In other exemplary embodiments, system 200 may be a "relative motion measurement system". In any event, for the exemplary implementations depicted in FIG. 2, system 200 includes a first device 202, a second device 204, and an external system 206. The first device 202 includes a first sensor unit 208, and the second device 204 includes a second sensor unit 210. Each sensor unit 208, 210 may be an IMU that includes a plurality or suite of inertial sensors. For example, devices 202 and 204 may represent two of the units depicted in FIG. 1, such as first unit 100 and second unit 101, respectively. Alternatively, devices 202 and 204 may represent first unit 100 and third unit 102, respectively. In any event, first sensor unit 208 and second sensor unit 210 each generate sensor data 212 and sensor data 214, respectively, which are conveyed (e.g., transmitted, broadcast, etc.) to a processing unit 216 associated with or included in second device 204. The sensor data 212, 214 may also be referred to as "first device sensor information" 212 and "second device sensor information" 214, respectively. In an exemplary implementation, the sensor data 212, 214 may be inertial sensor data, but note that the scope of the present invention or implementation is not intended to be limited to a specific type of sensor data.

As depicted in FIG. 2, first device 202 is positioned at a first location on a structural member 218, and second device 204 is positioned at a second location also on structural member 218. For example, structural member 218 may represent first structural member 109 in FIG. 1 in one implementation, or second structural member 110 in a different implementation. In some implementations, the relative and nominal positions of the first device 202 and the second device 204 may be described with reference to the relative and nominal positions of the first unit 100 and the second unit 101 in FIG. 1. In other implementations, the relative and nominal positions of the first device 202 and the second device 204 may be described with reference to the relative and nominal positions of the first unit 100 and the third unit 102. As such, structural member 218 may represent (among other things) a wing of an aircraft, the fuselage of an aircraft, or a section of a bridge or building being monitored, for example, for structural integrity.

For one or more example embodiments, processing unit 216 includes sensor compensation algorithm 218, which compensates the received sensor data 212 and 214 to produce compensated sensor information 219a, 219b and 219c. The compensated sensor information 219a, 219b, 219c is coupled to a relative navigation algorithm 220. Although not shown explicitly in FIG. 2, the relative navigation solution information 221 may be coupled to a pre-filter unit, which filters this information before it is received at a data fusion algorithm 222. In one implementation of this embodiment, the pre-filter unit may be included in the data fusion algorithm 222. In another implementation, the pre-filter unit may be included in the relative navigation algorithm 220. In any event, the relative navigation solution information 221 is also provided as an output to the external system 206.

The relative navigation algorithm 220 processes the compensated sensor information 219a, 219b and 219c, and generates the relative navigation solution information 221. The generated relative navigation solution information 221 is indicative of at least one of: a relative position vector 113 (FIG. 1) from the second position 106 relative to the first position 104; a relative velocity of the second position 106 relative to the first position 104; and a relative attitude of the first unit 100 (e.g., first device 202) at the first position 104 relative to the second unit 101 (e.g., second device 204) at the second position 106. As such, the relative navigation solution information 221 may be composed of one or more relative states.

The pre-filter unit (not shown) can be used to filter error information as described in detail below. The data fusion algorithm 222 receives the relative states of the relative navigation solution information 221 from the pre-filter unit. The relative states are a function of at least the compensated sensor information 219a, 219b and 219c and received reference nominal lever-arm vector information 224. For example, in one implementation, the pre-filter unit may include a first-order roll-off filter or a notch filter. The pre-filter unit processes the outputs received from the relative navigation algorithm 220.

The data fusion algorithm 222 processes the reference information 224 and the outputs received from the pre-filter unit to provide control over the errors arising from errors in the sensor data 212 and 214. In this exemplary implementation, the reference information 224 is data that can represent the nominal lever-arm 111 (FIG. 1) between the second position 105 relative to the first position 103, and a nominal relative velocity of the second position 105 relative to the first position 103.

In one example implementation, the data fusion algorithm 222 may be executed with a Kalman filter, which is an approach that is well known in the art. As such, the terms "data fusion algorithm", "data fusion unit" and "Kalman filter" may be used interchangeably within this document. However, it should be understood that other suitable implementations of data fusion algorithms or data fusion units are possible and may be used.

For this exemplary implementation, the relative navigation solution information 221 is composed of the position of the second unit 101 (e.g., second device 204) relative to the first unit 100 (e.g., first device 202), a velocity of the second unit 101 relative to the first position 104, and an attitude of the second unit 101 relative to the first unit 100. The data fusion algorithm 222 provides closed-loop error control by generating resets 226 to the relative navigation states, and resets 228 to the sensor compensation coefficients. In one implementation, the resets 226 may be algorithm resets, and the resets 228 may be device resets. The algorithm resets 226 provide corrective feedback to the relative navigation algorithm 220 to control errors in the relative navigation solution information 221. The device resets 228 provide corrective feedback to the sensor compensation algorithm 218 to control errors in the combination of data from the first unit 100 and the second unit 101. As defined herein, the device resets 228 are sensor compensation coefficient resets. As mentioned earlier, the relative navigation solution information 221 is also provided as an output to external system 206.

The inertial sensors 208 of the first device 202 (e.g., first unit 100 in FIG. 1) and the inertial sensors 210 of the second device 204 (e.g., second unit 101 or third unit 102) can communicate with processing unit 216 via a wireless connection (e.g., radio frequency transmission) or a wired connection. The relative navigation algorithm 220 is communicatively coupled to the data fusion algorithm 222 to allow input and output signal flow between the two units. The relative navigation algorithm 220 is also communicatively coupled to the sensor compensation algorithm 218 to allow input and output signal flow between those two units.

The second unit 101 (e.g., second device 204 in FIG. 2) located at a second nominal position 105 is nominally offset from the first position 103 by a nominal lever-arm 111 when the structural member 109 is unflexed. The first unit 100 (e.g., first device 202) located at a first position 104 is configured to generate first unit information (e.g., sensor data 212) that is responsive to a motion of the first position 104. The second unit 101 (e.g., second device 204) is configured to generate second unit information (e.g., sensor data 214) that is responsive to a motion of the second position 106.

The processing unit 216 generates relative navigation solution information 221 as a function of the compensated sensor information 219a, 219b and 219c. The generated relative navigation solution information 221 is indicative of at least one of: a relative position (indicated by the relative position vector 113 in FIG. 1) of the second position 106 relative to the first position 104; a relative velocity of the second position 106 relative to the first position 104; and a relative attitude of the first unit 100 (e.g., first device 202) at the first position 104 relative to the second unit 101 (e.g., second device 204) at the second position 106.

The processing unit 216 receives the sensor data 212 from the inertial sensors unit 208 of first device 202, and sensor data 214 from the inertial sensors unit 210 of second device 204. Additionally, the processing unit 216 generates compensated sensor information 219a, 219b and 219c from the sensor data 212 and 214. Furthermore, the processing unit 216 generates resets 226 to the relative states of the relative navigation solution information 221, and resets 228 to the compensated sensor information 219a, 219b and 219c.

The sensor compensation algorithm 218 is configured to generate the compensated sensor information 219a, 219b and 219c from the sensor data 212 and 214. The relative navigation algorithm 220 is configured to receive the compensated sensor information 219a, 219b and 219c from the sensor compensation algorithm 218, receive the resets 226 from the data fusion algorithm 222, and generate the relative navigation states as a function of at least the compensated sensor information 219a, 219b and 219c.

The data fusion algorithm 222 is configured to receive the relative navigation solution information 221 and the reference information 224 to generate resets 226 and 228 based on the relative navigation solution information 221 and the reference information 224. The data fusion algorithm 222 is also configured to output the resets 226 to the relative navigation algorithm 220, and output the resets 228 to the sensor compensation algorithm 218. The resets 226 and 228 are corrective feedback signals used to control errors in the relative navigation solution information 221.

Figure 3:
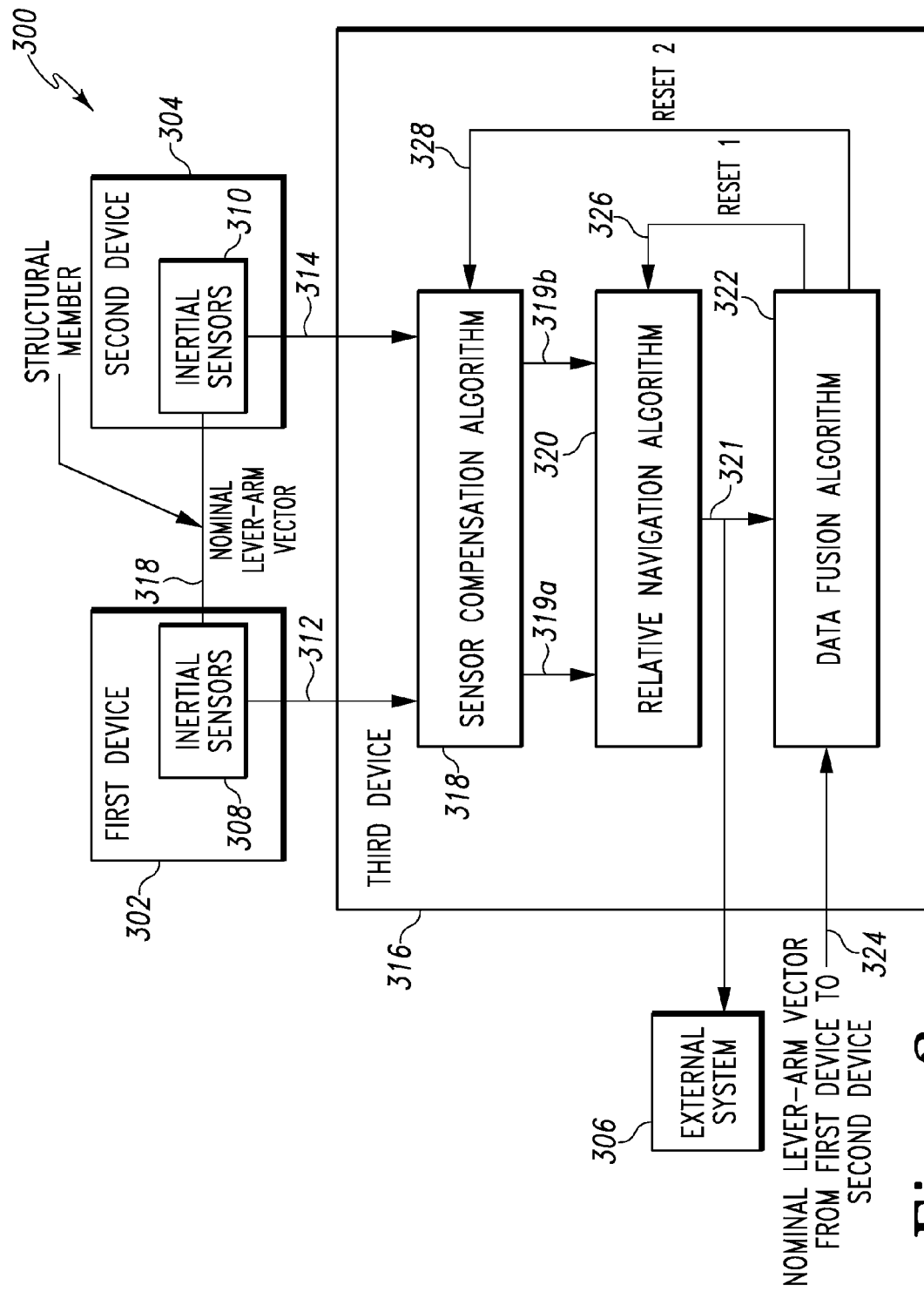
FIG. 3 is a block diagram depicting an exemplary configuration for a system that also incorporates two sets of sensors or IMUs, which can also be used to implement one or more embodiments of the present invention.

FIG. 3 is a block diagram depicting an exemplary configuration for a system 300 that incorporates two IMUs (e.g., suites or sets of inertial sensors), which can be used to implement one or more embodiments of the present invention. Similar to system 200 depicted in FIG. 2, system 300 may be referred to as a "relative navigation system" or "relative motion measurement system". However, note that the example implementation illustrated by system 300 is significantly different than the example implementation illustrated by system 200 in FIG. 2, because system 300 includes two IMUs (or sets of inertial sensors) located at different positions, and both IMUs are also located at different positions than that of the processing unit involved. In system 200, one IMU is co-located with the processing unit depicted in that implementation.

For the exemplary implementations depicted in FIG. 3, system 300 includes a first device 302, a second device 304, a third device 316, and an external system 306. The first device 302 includes a first sensor unit 308, and the second device 304 includes a second sensor unit 310. Each sensor unit 308 and 310 may be an IMU that includes a plurality, set or suite of inertial sensors. For example, devices 302 and 304 may represent two of the units depicted in FIG. 1, such as first unit 100 and second unit 101, respectively. In that case, third device 316 may represent third unit 102. Alternatively, devices 302 and 304 may represent first unit 100 and third unit 102, respectively, and third device 316 may represent second unit 101. In any event, first sensor unit 308 and second sensor unit 310 each generate sensor data 312 and sensor data 314, respectively, which are conveyed (e.g., transmitted, broadcast, etc.) to a processing unit co-located with, and included in, third device 316. Thus, the terms "third device" and "processing unit" may be used interchangeably for this exemplary implementation. Also, the sensor data 312 and 314 may be referred to as "first device sensor information" 312 and "second device sensor information" 314, respectively. In an exemplary implementation, the sensor data 312 and 314 may be inertial sensor data, but note that the scope of the present invention is not intended to be limited to a specific type of sensor data.

As depicted in FIG. 3, first device 302 is positioned at a first location on a structural member 318, and second device 304 is positioned at a second location also on structural member 318. Third device 316 is positioned at a third location. For example, structural member 318 may represent first structural member 109 in FIG. 1 in one implementation, or second structural member 110 in a different implementation. In some implementations, the relative and nominal positions of the first device 302 and the second device 304 may be described with reference to the relative and nominal positions of the first unit 100 and the second unit 101 in FIG. 1. In other implementations, the relative and nominal positions of the first device 302 and the second device 304 may be described with reference to the relative and nominal positions of the first unit 100 and the third unit 102. As such, structural member 318 may represent a wing of an aircraft, the fuselage or body of an aircraft, or a section of a bridge or building being monitored, for example, for structural integrity.

For one or more example embodiments, processing unit (third device) 316 includes sensor compensation algorithm 318, which compensates the received sensor data 312 and 314 to produce compensated sensor information 319a and 319b. The compensated sensor information 319a and 319b is coupled to a relative navigation algorithm 320. Similar to the implementation depicted in FIG. 2, the relative navigation solution information 321 may be coupled to a pre-filter unit (not shown), which can be used to filter this information before it is received at a data fusion algorithm 322. For example, the pre-filter unit may be included in the data fusion algorithm 322 or the relative navigation algorithm 320. In any event, the relative navigation solution information 321 is also provided as an output to the external system 306.

The relative navigation algorithm 320 processes the compensated sensor information 319a and 319b, and generates the relative navigation solution information 321. The generated relative navigation solution information 321 is indicative of at least one of: a relative position vector 113 (FIG. 1) from the second position 106 relative to the first position 104; a relative velocity of the second position 106 relative to the first position 104; and a relative attitude of the first unit 100 (e.g., first device 302) at the first position 104 relative to the second unit 101 (e.g., second device 304) at the second position 106. As such, the relative navigation solution information 321 may be composed of one or more relative states.

If used, the pre-filter unit can be used to filter error information as described below. The data fusion algorithm 322 receives the relative states of the relative navigation solution information 321 from the pre-filter unit. The relative states are a function of at least the compensated sensor information 319a and 319b and received reference nominal lever-arm vector information 324. For example, the pre-filter unit may include a first-order roll-off filter or a notch filter. The pre-filter unit processes the outputs received from the relative navigation algorithm 320.

The data fusion algorithm 322 processes the reference information 324 and the outputs received from the pre-filter unit to provide control over the errors arising from errors in the sensor data 312 and 314. In this exemplary implementation, the reference information 324 is data that represents the nominal lever-arm 111 (FIG. 1) between the second position 105 relative to the first position 103, and a nominal relative velocity of the second position 105 relative to the first position 103.

For this exemplary implementation, the relative navigation solution information 321 is composed of the position of the second unit 101 (e.g., second device 304) relative to the first unit 100 (e.g., first device 302), a velocity of the second unit 101 relative to the first position 104, and an attitude of the second unit 101 relative to the first unit 100. The data fusion algorithm 322 provides closed-loop error control by generating resets 326 to the relative navigation states, and resets 328 to the sensor compensation coefficients. The resets 326 are algorithm resets, and the resets 328 are device resets. The algorithm resets 326 provide corrective feedback to the relative navigation algorithm 320 to control errors in the relative navigation solution information 321. The device resets 328 provide corrective feedback to the sensor compensation algorithm 318 to control errors in the combination of data from the first unit 100 (e.g., first device 302) and the second unit 101 (e.g., second device 304). As defined herein, the device resets 328 are sensor compensation coefficient resets. The relative navigation solution information 321 is also provided as an output to external system 306.

The inertial sensors 308 of the first device 302 (e.g., first unit 100 in FIG. 1) and the inertial sensors 310 of the second device 304 (e.g., second unit 101 or third unit 102) can communicate with processing unit (third device) 316 via a wireless connection (e.g., transmission or broadcast) or a wired connection. The relative navigation algorithm 320 is communicatively coupled to the data fusion algorithm 322 to allow input and output signal flow between the two units. The relative navigation algorithm 320 is also communicatively coupled to the sensor compensation algorithm 318 to allow input and output signal flow between those two units.

The second unit 101 (e.g., second device 304 in FIG. 3) located at a second nominal position 105 is nominally offset from the first position 103 by a nominal lever-arm 111 when the structural member 109 is unflexed. The first unit 100 (e.g., first device 302) located at a first position 104 is configured to generate first unit information (e.g., sensor data 312) that is responsive to a motion of the first position 104. The second unit 101 (e.g., second device 304) is configured to generate second unit information (e.g., sensor data 314) that is responsive to a motion of the second position 106.

The processing unit 316 (of the third device) generates relative navigation solution information 321 as a function of the compensated sensor information 319a and 319b. The generated relative navigation solution information 321 is indicative of at least one of: a relative position (indicated by the relative position vector 113 in FIG. 1) of the second position 106 relative to the first position 104; a relative velocity of the second position 106 relative to the first position 104; and a relative attitude of the first unit 100 (e.g., first device 302) at the first position 104 relative to the second unit 101 (e.g., second device 304) at the second position 105.

The processing unit 316 receives the sensor data 312 from the inertial sensors unit 308 of first device 302, and sensor data 314 from the inertial sensors unit 310 of second device 304. Additionally, the processing unit 316 generates compensated sensor information 319a and 319b from the sensor data 312 and 314. Furthermore, the processing unit 316 generates resets 326 to the relative states of the relative navigation solution information 321, and resets 328 to the compensated sensor information 319a and 319b.

The sensor compensation algorithm 318 is configured to generate the compensated sensor information 319a and 319b from the sensor data 312 and 314. The relative navigation algorithm 320 is configured to receive the compensated sensor information 319a and 319b from the sensor compensation algorithm 318, receive the resets 326 from the data fusion algorithm 322, and generate the relative states as a function of at least the compensated sensor information 319a and 319b.

The data fusion algorithm 322 is configured to receive the relative navigation solution information 321 and the reference information 324 to generate resets 326 and 328 based on the relative navigation solution information 321 and the reference information 324. The data fusion algorithm 322 is also configured to output the resets 326 to the relative navigation algorithm 320, and output the resets 328 to the sensor compensation algorithm 318. The resets 326 and 328 are corrective feedback signals used to control errors in the relative navigation solution information 321.

Figure 4A:
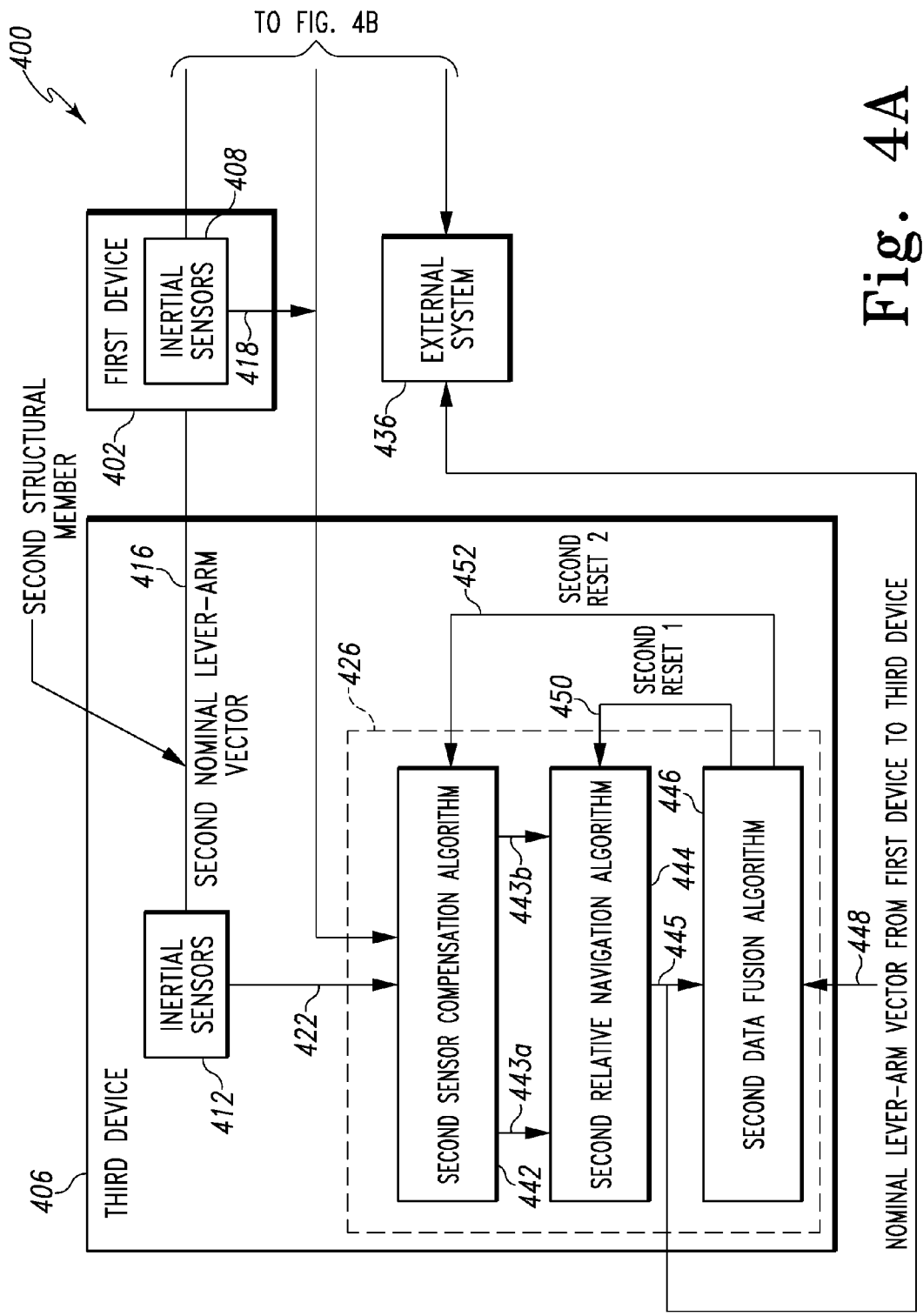
FIGS. 4A and 4B are block diagrams depicting an example configuration for a system that includes three sets of sensors or IMUs, which can be used to implement one or more embodiments of the present invention.
Figure 4B:
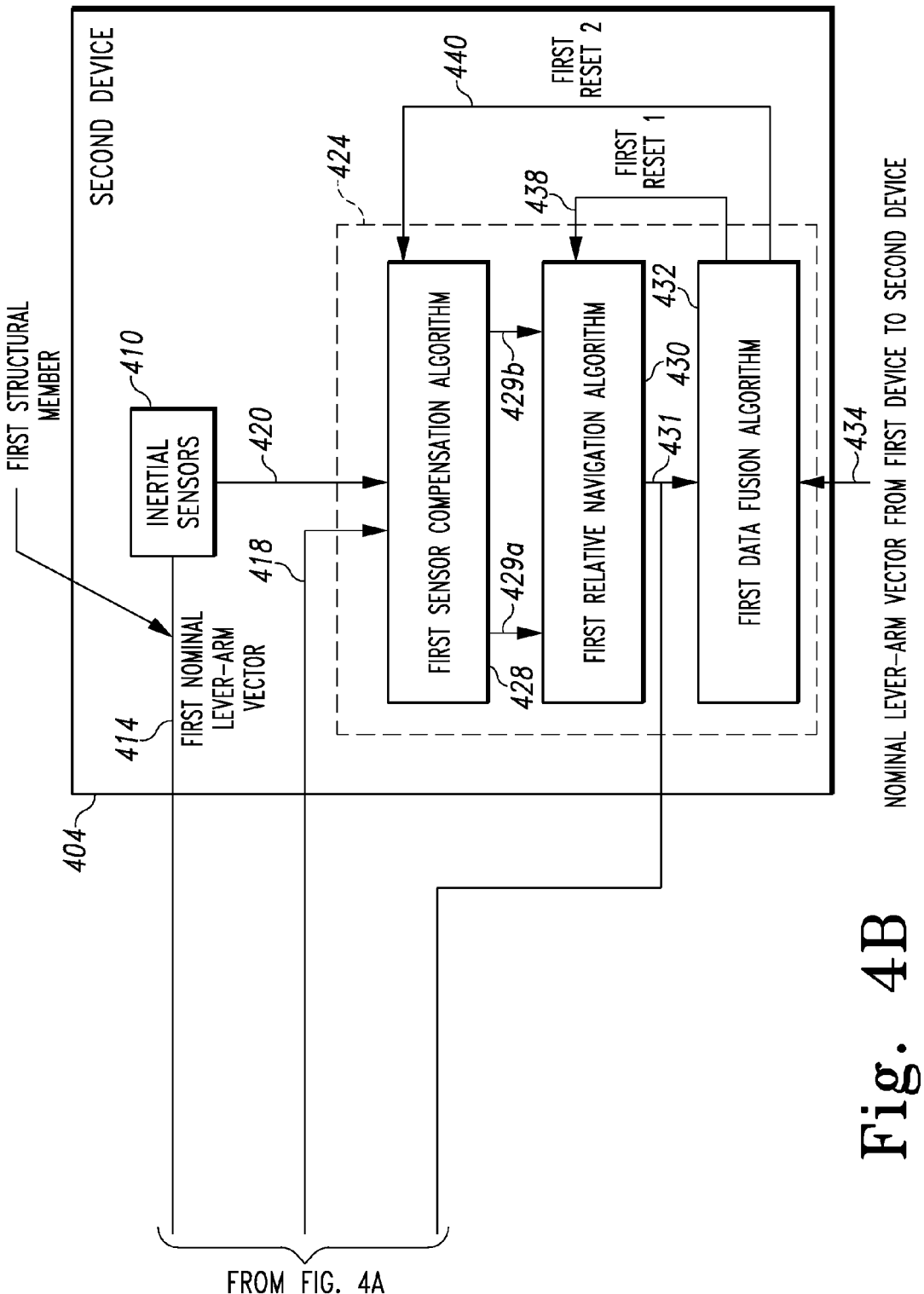

FIGS. 4A and 4B are block diagrams depicting an example configuration for a system 400 that includes three IMUs (e.g., suites or sets of inertial sensors), which can be used to implement one or more embodiments of the present invention. Similar to systems 200 and 300 described above with respect to FIGS. 2 and 3, system 400 may be referred to as a "relative navigation system" or "relative motion measurement system". However, note that for this example implementation, system 400 is significantly different than the example implementations illustrated by systems 200 and 300, because system 400 includes three IMUs (or sets of inertial sensors) located at different positions, and two of the three IMUs are co-located with a respective processing unit. Thus, system 400 provides a distributed implementation for a relative navigation system or relative motion measurement system with three IMUs.

For this example implementation, system 400 includes a first device 402, a second device 404, and a third device 406. Each device 402, 404 and 406 may be an IMU, and each device or IMU includes a respective set of inertial sensors 408, 410 and 412. For example, each device 402, 404 and 406, and the sets of inertial sensors 408, 410 and 412 (e.g., IMUs) may be configured as described above with respect to units 100, 101 and 102, respectively, shown in FIG. 1.

Notably, second device 404 includes a first processing unit 424, and third device 406 includes a second processing unit 426. First processing unit 424 includes a first sensor compensation algorithm 428, a first relative navigation algorithm 430, and a first data fusion algorithm 432. Second processing unit 426 includes a second sensor compensation algorithm 442, a second relative navigation algorithm 444, and a second data fusion algorithm 446. Notably, for at least this example implementation, the design and functions of the components of first processing unit 424 and second processing unit 426 are deemed virtually identical.

The first set of inertial sensors 408 is configured to convey (e.g., transmit, broadcast, etc.) the first sensor data 418 to the first sensor compensation algorithm 428 and the second sensor compensation algorithm 442. The second set of inertial sensors 410 is configured to convey (e.g., transmit, broadcast, etc.) the second sensor data 420 to the first sensor compensation algorithm 428, and the third set of inertial sensors 412 is configured to convey (e.g., transmit, broadcast, etc.) the third sensor data 422 to the second sensor compensation algorithm 442.

The relative motion between the first device 402 and the third device 406 is obtained in a manner similar to that described above with respect to determining the relative motion between first device 202 (e.g., unit 100 in FIG. 1) and second device 204 (e.g., unit 101 in FIG. 2). In this case, second reference information 448 is composed of the nominal position of the third device 406 (unit 102) relative to the first device 402 (unit 100), and a nominal relative velocity and attitude of the third position 107 (FIG. 1) relative to the first position 103. The second processing unit 426 determines the relative navigation solution information 445 of the third device 406 relative to the first device 402, and generates resets 450 and 452 as a function of the relative navigation solution information 445 and the second reference information 448.

The first device 402 (e.g., unit 100) and the third device 406 (e.g., unit 102) communicate via a wireless or wired connection with the second processing unit 426. The second relative navigation algorithm 444 is communicatively coupled to the second data fusion algorithm 446 to allow input and output signal flow between the second relative navigation algorithm 444 and the second data fusion algorithm 446. The second relative navigation algorithm 444 is also communicatively coupled to the second sensor compensation algorithm 442 to allow input and output signal flow between the two units involved.

As illustrated by system 400 in FIGS. 4A and 4B, a plurality of inertial sensor unit pairs may be utilized in any given application. For example, system 400 includes a first pair of inertial sensor units 408 and 410, and a second pair of inertial sensor units 408 and 412. The plurality of inertial sensor units 408, 410 and 412 are each located at a related position, and each is configured to generate sensor information that is responsive to motion of the respective device 402, 404 and 406 involved. Each of the devices 404 and 406 is located at a position nominally offset from the location of the first device 402 at the first position by a respective nominal lever-arm 414 and 416. Each of the devices 404 and 406 forms a respective pair of devices with first device 402.

Each of the relative navigation algorithms 430 and 444 in the respective processing units 424 and 426 is associated with a respective pair of devices 402, 404 and 402, 406. Each relative navigation algorithm 430, 444 is configured to generate relative states of a relative navigation solution for each pair of devices 402 to 404 and 402 to 406. Each of the plurality of data fusion algorithms 432 and 446 in the respective processing units 424 and 426 is associated with a respective one of the plurality of relative navigation algorithms 430 and 444, and a respective pair of devices 402 to 404 and 402 to 406. Each data fusion algorithm 432 and 446 generates respective resets 438 and 450 to the relative states of the respective relative navigation solution 431 and 445 for each respective pair of devices 402 to 404 and 402 to 406. The relative navigation solutions 431 and 445 are provided as outputs for communication with the external system 436.

Notably, by directly extending the main concept illustrated in FIGS. 4A and 4B, it should be readily understood that a plurality of more than three inertial sensor units that form three or more pairs of inertial sensor units may be utilized in any given application. In this regard, examples of such broader implementations will be described below with respect to FIGS. 7A through 12. Also, it should be understood that a relative navigation solution may be obtained for any number of slave devices with respect to a master device, and if desired, the relative navigation states of two of these solutions can be differenced to yield the relative navigation states relevant to two slave devices involved.

Figure 5:
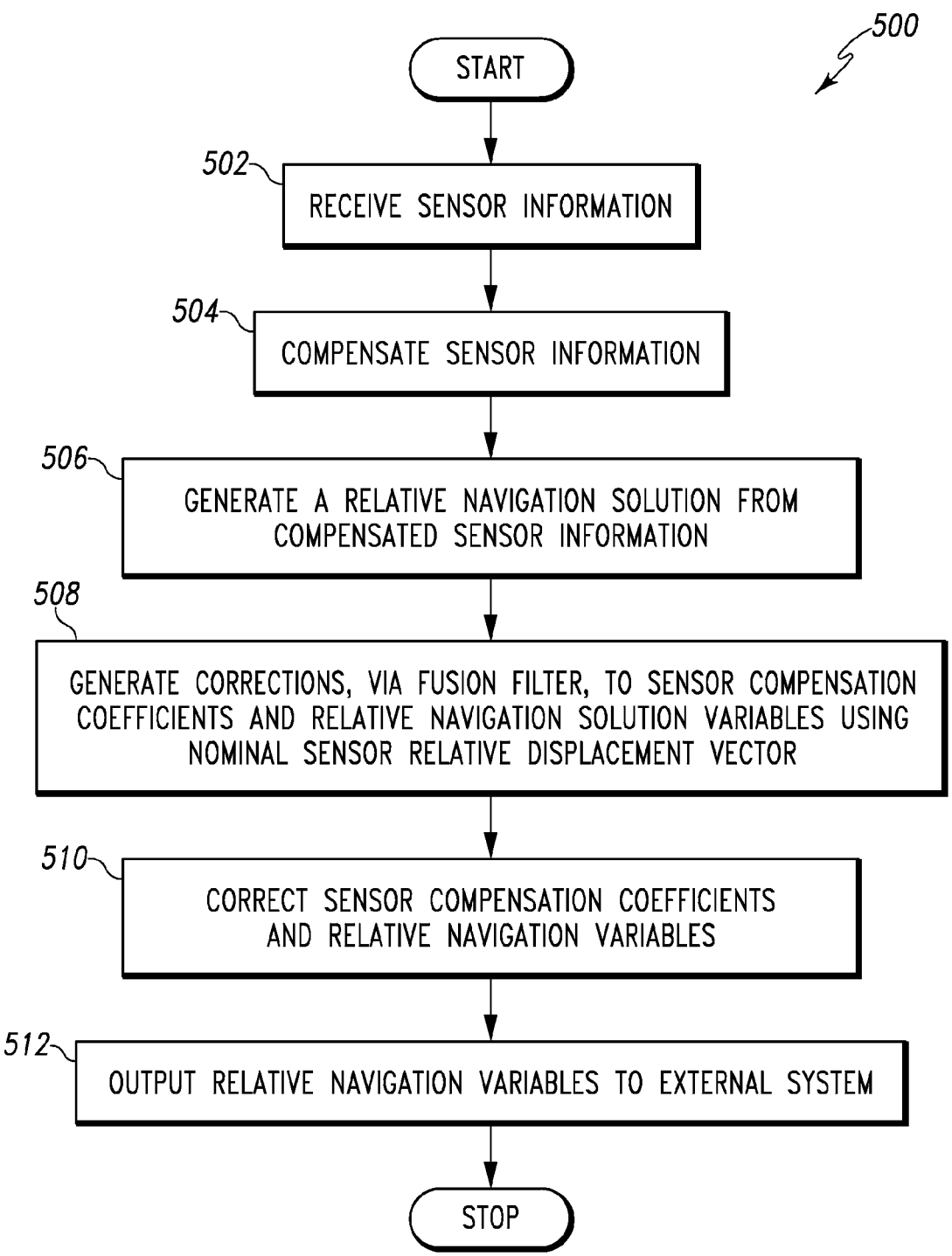
FIG. 5 is a flow diagram of an example method for determining the relative position, velocity and attitude vectors between a plurality of sets of sensors or IMUs, which can be used to implement one or more embodiments of the present invention.

The flow of the above-described operations is outlined below with respect to the diagram depicted in FIG. 5. In this regard, FIG. 5 is a flow diagram of an example method 500 for determining the relative motion between a plurality of sensor sets (e.g., IMUs), which may be used to implement one or more embodiments of the present invention. For example, method 500 may be used to accurately determine one or more relative navigation solutions between the inertial sensors associated with units 100 and 101 (and/or 100 and 102) in FIG. 1, or for first and second devices 402 and 404 (and/or first and third devices 402 and 406) in FIGS. 4A and 4B. For illustrative purposes and ease of explanation, the operations inherent in the steps of method 500 will be described herein with reference to the exemplary implementation of system 400 shown in FIGS. 4A and 4B. However, the steps of method 500 may also be used for implementing the exemplary systems shown in FIGS. 2-3 and 6-12. Also, for ease of explanation and clarity, the steps of method 500 will be described herein only with respect to the operations of the first device 402 and second device 404, because as discussed earlier, the design and functional capabilities of the third device 406 and the second device 404 are virtually identical.

In any event, the flow diagram depicted in FIG. 5 may be implemented by software embodied on a storage medium including a plurality of program instructions. For example, each of the sensor compensation algorithms 424 and 426, relative navigation algorithms 430 and 444, and data fusion algorithms 432 and 446 shown in FIGS. 4A and 4B may include suitable software instructions to perform the described operations. In at least one example implementation, method 500 represents an algorithm that can be used to determine the relative motion between one or more pairs of sensors. In any event, the flow diagram depicted in FIG. 5 may be implemented by software embodied on a storage medium including a plurality of program instructions. For example, each of the sensor compensation algorithms 424 and 426, relative navigation algorithms 430 and 444, and data fusion algorithms 432 and 446 shown in FIG. 4 may include suitable software instructions to perform the described operations. In at least one example implementation, method 500 represents an algorithm that can be used to determine the relative motion between one or more pairs of sensors.

Referring now to FIGS. 4A, 4B and 5 for this example implementation, method 500 begins with the first processing unit 424 (co-located with second device 404) receiving sensor data 418 and 420 from inertial sensor unit 408 (co-located with the first device 402) and inertial sensor unit 410 (co-located with second device 404), respectively (step 502). For example, each inertial sensor unit 408 and 410 may represent an IMU. The sensor data 418 and sensor data 420 are indicative of a motion of a first position of the first device 402 (e.g., first unit 100 in FIG. 1) and a motion of a second position of the second device 404 (e.g., second unit 101 in FIG. 1), respectively. In one example implementation, the sensor data 418 and 420 may be provided in the form of incremental angles (e.g., delta-thetas) from the three members of a gyroscope triad, and incremental velocities (e.g., delta-vs) from the three members of an accelerometer triad. For example, the frequency of sensor data transmittal may be greater than 100 Hz.

Next, the first sensor compensation algorithm 428 compensates the inertial sensor data 418 and 420 to generate compensated sensor information 429a and 429b (step 504). The compensated sensor information 429a, 429b is indicative of a relative position vector of the second position relative to the first position, a relative velocity of the second position relative to the first position, or a relative attitude of the first device 402 (e.g., first unit 100 in FIG. 1) at the first position relative to the second device 404 (e.g., second unit 101 in FIG. 1) at the second position. Specifically, the sensor data 418 and 420 is compensated for bias adjustments determined by the first data fusion algorithm 432 in the course of system operations (e.g., as described below with respect to step 508). For example, in one implementation, the sensor data 418 and 420 may be compensated for scale factor. However, sensor data compensation for other factors is also possible. Such compensation is important in many applications where some adjustments in the sensor bias compensation coefficients from their factory-set values are needed to achieve maximum system performance, or to compensate for changes in the device after it was calibrated in the laboratory.

Next, the first relative navigation algorithm 430 generates relative navigation solution information 431 as a function of the compensated sensor information 429a and 429b (step 506). The first sensor compensation algorithm 428 receives resets 440 from the first data fusion algorithm 432. The resets 440 are generated based on the relative navigation solution information 431 and the nominal lever-arm vector reference information 434. The reference information 434 is indicative of at least one of a nominal position of the second device 404 (e.g., second unit 101 in FIG. 1) relative to the nominal position of the first device 402 (e.g., first unit 100), and a nominal velocity and attitude of the second device 404 (unit 101) relative to the first device 402 (unit 100). For example, the compensated sensor information 429a and 429b may be processed through a set of strapdown relative navigation algorithms 430 to yield a relative attitude matrix, a relative velocity vector, and a relative position vector for a slave IMU (e.g., inertial sensor unit 410) with respect to a master IMU (e.g., inertial sensor unit 408).

In one example implementation, the relative navigation position vector is periodically compared (e.g., at a rate on the order of 1 Hz) to the nominally known lever-arm 414 between the "master" IMU 408 and a respective "slave" IMU 410 or 412. The resulting measurements are provided to the first data fusion algorithm 432 (or, alternatively, to the second data fusion algorithm 446). For example, using the exemplary configurations shown in FIG. 1, a respective relative navigation position vector is periodically compared to nominally known lever-arm 111 or 112 between the master IMU 100 and a respective slave IMU 101 or 102.

Returning to method 500, the first data fusion algorithm 432 then generates corrective feedback as a function of at least the relative navigation solution information 431 and the reference information 434 (step 508). For example, the first data fusion algorithm 432 can determine optimal corrections to the relative navigation states and the sensor bias compensation coefficients involved. In any event, for this example implementation, the corrective feedback is shown as resets 438 and 440 in FIG. 4B.

As such, the first data fusion algorithm 432 outputs incremental adjustments to the first sensor compensation algorithm 428 and the first relative navigation algorithm 430. For example, the incremental adjustments are output in the form of algorithm resets 438 and device resets 440, which are provided to the first relative navigation algorithm 430 and first sensor compensation algorithm 428, respectively. The reset signals 438 and 440 may be transmitted at a suitable fusion filter update rate (e.g., on the order of 1 Hz).

Next, the algorithm resets 438 and device resets 440 received at the first relative navigation algorithm 430 and first sensor compensation algorithm 428, respectively, are used to adjust the relative navigation variables and sensor compensation coefficients (step 510). The device resets 440 are used for adjusting the sensor compensation coefficients, which control errors in the combination of data from the first device 402 and the second device 404. The algorithm resets 438 are used for adjusting the relative navigation variables or relative navigation solution information 431.

The first relative navigation algorithm 430 then outputs the relative navigation solution information 431 to one or more external (e.g., user) systems 436 (step 512). For example, the relative navigation solution information 431 may be incorporated into one or more subsequent processing and/or monitoring operations. This process may be carried out at the highest rate at which the relative navigation solution information can be refreshed. For example, the relative navigation solution information 431 may be refreshed at a 100 Hz rate. The flow of method 500 may then be terminated or returned to step 502.

Figure 6:
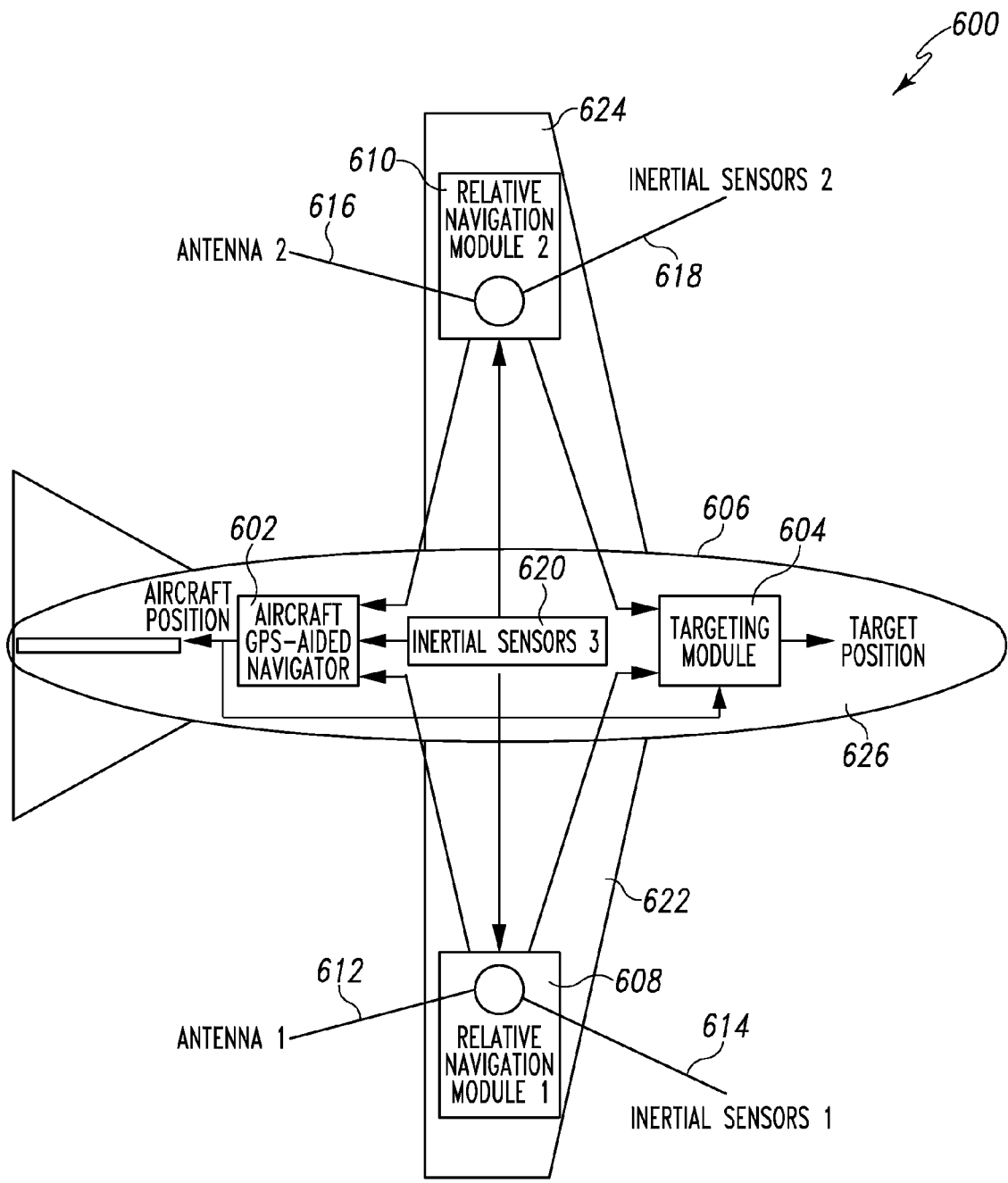
FIG. 6 depicts a pictorial diagram that represents an example relative navigation system, which can be used to implement one or more embodiments of the present invention.

FIG. 6 depicts a pictorial diagram that represents an example relative navigation system 600, which can be used to implement one or more embodiments of the present invention. For example, system 600 may be used to implement an embodiment of system 400 depicted in FIGS. 4A and 4B. In this regard, relative navigation system 600 includes a UTC INS/GPS 602 for determining the position of an airborne vehicle 606, and a targeting module 604 for determining the position of a target located in front of the airborne vehicle 606. For example, the target may be an object acquired by a navigation radar system or weapons radar system located internally or externally to the airborne vehicle 606, and the airborne vehicle 606 may be an aircraft or space-borne vehicle in flight.

For this example implementation, system 600 includes a first relative navigation module 608, and a second relative navigation module 610. The first relative navigation module 608 includes a first antenna unit 612 and a first set of inertial sensors 614. The second relative navigation module 610 includes a second antenna unit 616 and a second set of inertial sensors 618. For example, the first antenna unit 612 and second antenna unit 616 may include GPS antennas or ESM antennas (or both). Note that the first relative navigation module 608 is located near an outboard edge of a first wing 622 of airborne vehicle 606, and the second relative navigation module 610 is located near an outboard edge of a second wing 624. Also note that a third set of inertial sensors 620 is located within the main body or fuselage 626 of the airborne vehicle 606. For example, the first relative navigation module 608 may represent the second device 404 shown in FIG. 4B (plus the antenna unit 612), the second relative navigation module 610 may represent the third device 406 in FIG. 4A (plus the antenna unit 616), and the third set of inertial sensors 620 may represent first device 402 in FIG. 4A. In other words, system 600 includes three sets of inertial sensors located at different positions on the airborne vehicle involved, and two of the sets of inertial sensors are co-located with a relative navigation processing unit.

Thus, in this exemplary configuration, system 600 provides a distributed processing approach for obtaining high accuracy relative navigation solutions for the airborne systems involved. For example, the first relative navigation module 608 provides a first relative navigation solution as one input to the INS/GPS 602 and the targeting module 604, and the second relative navigation module 610 provides a second relative navigation solution as a second input to each of the INS/GPS 602 and targeting module 604. Consequently, the performance capabilities of both the INS/GPS 602 and targeting module 604 are enhanced by knowledge of the two input relative navigation solutions, which in turn enhances the airborne vehicle's overall navigation solutions.

Figure 7A:
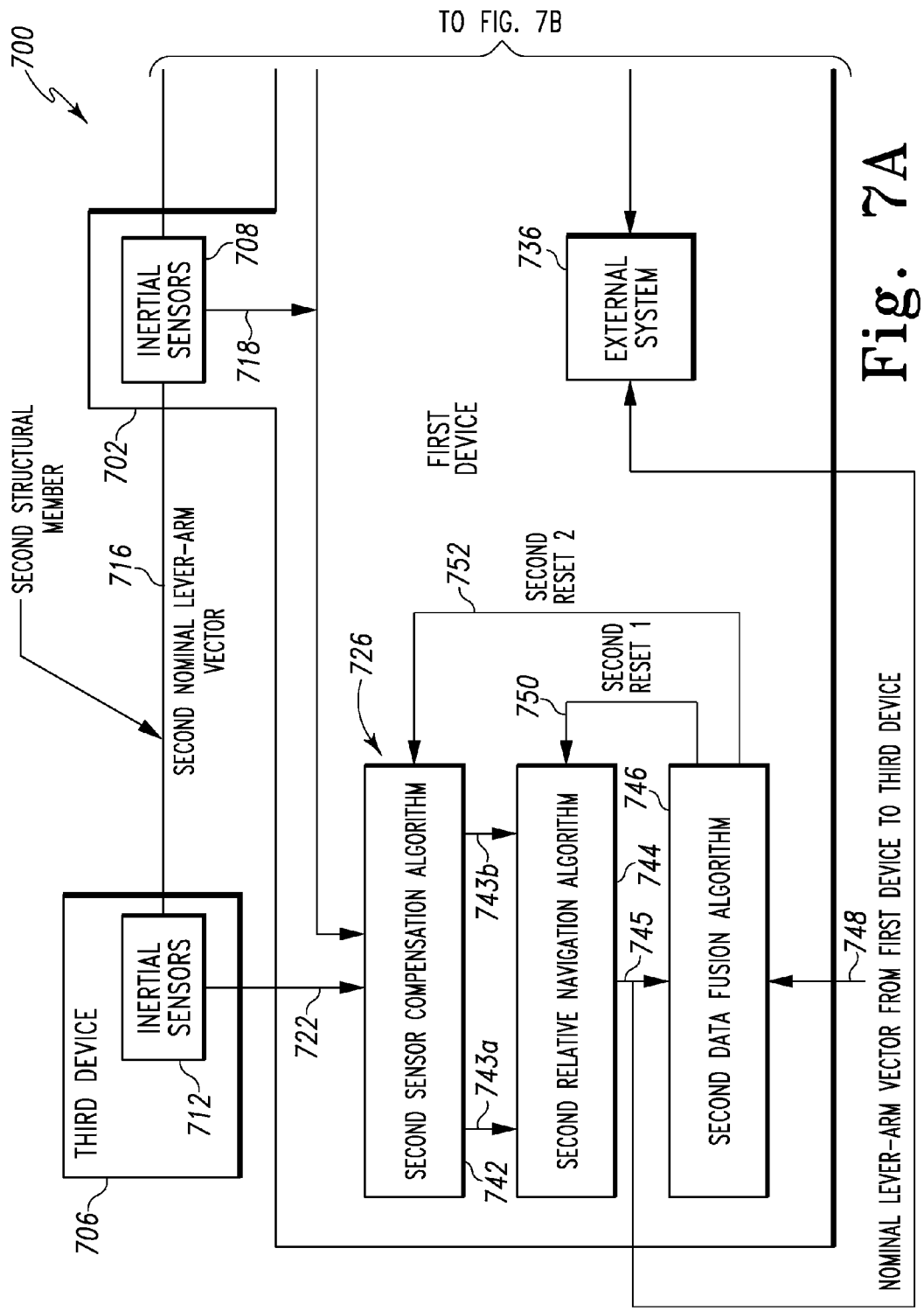
FIGS. 7A and 7B are block diagrams depicting an example configuration for another system that also includes three sets of sensors or IMUs, which can be used to implement one or more embodiments of the present invention.
Figure 7B:
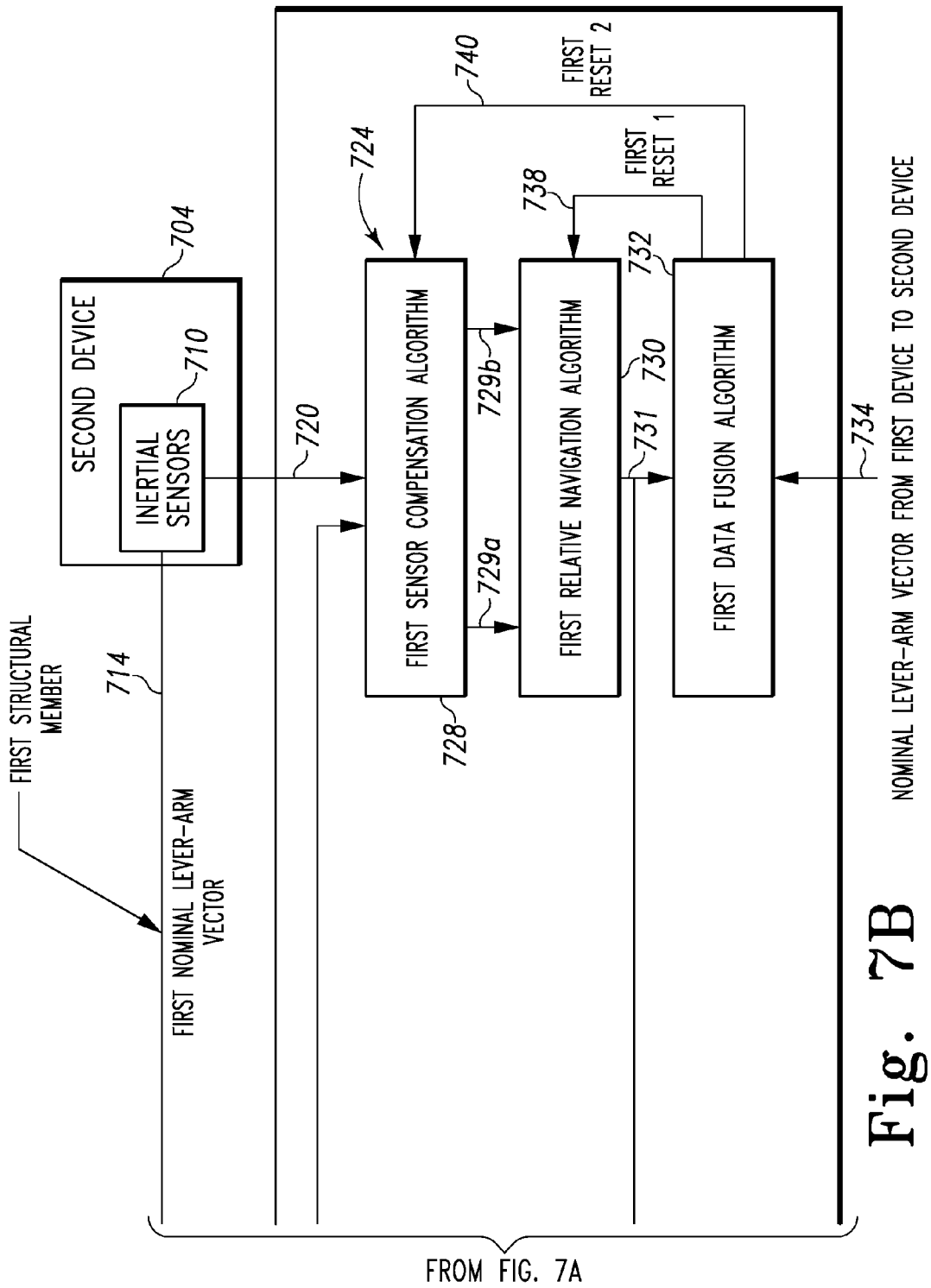

FIGS. 7A and 7B are block diagrams depicting an example configuration for a system 700 that also includes three IMUs (e.g., suites or sets of inertial sensors), which can be used to implement one or more embodiments of the present invention. Similar to system 400 described above with respect to FIGS. 4A and 4B, system 700 may be referred to as a "relative navigation system" or "relative motion measurement system". However, note that for this example implementation, system 700 is significantly different than the example implementation illustrated by system 400, because although system 700 includes three IMUs (or sets of inertial sensors) located at different positions, only one of the three IMUs is co-located with the two processing units involved.

For this example implementation, system 700 includes a first device 702, a second device 704, and a third device 706. Each device 702, 704 and 706 may be an IMU, and each device or IMU includes a respective set of inertial sensors 708, 710 and 712. For example, each device 702, 704 and 706, and the sets of inertial sensors 708, 710 and 712 (e.g., IMUs) may be configured as described above with respect to units 100, 101 and 102, respectively, shown in FIG. 1.

Notably, first device 702 includes a first processing unit (indicated generally by numeral 724) and a second processing unit (indicated generally by numeral 726). However, the implementation shown is not intended to be limited by the number of processing units involved. For example, the components and functions of the two processing units 724 and 726 may be combined and performed with a single processing unit. In any event, for this exemplary implementation, the first processing unit 724 includes a first sensor compensation algorithm 728, a first relative navigation algorithm 730, and a first data fusion algorithm 732. Second processing unit 726 includes a second sensor compensation algorithm 742, a second relative navigation algorithm 744, and a second data fusion algorithm 746. Notably, for at least this example implementation, the design and functions of the components of first processing unit 724 and second processing unit 726 are deemed virtually identical.

The first set of inertial sensors 708 is configured to convey (e.g., transmit, broadcast, etc.) the first sensor data 718 to the first sensor compensation algorithm 728 and the second sensor compensation algorithm 742. The second set of inertial sensors 710 is configured to convey (e.g., transmit, broadcast, etc.) the second sensor data 720 to the first sensor compensation algorithm 728, and the third set of inertial sensors 712 is configured to convey (e.g., transmit, broadcast, etc.) the third sensor data 722 to the second sensor compensation algorithm 742.

Again, the relative motion between the first device 702 and the third device 706 may be obtained in a manner similar to that described above with respect to determining the relative motion between the first device 202 (e.g., unit 100 in FIG. 1) and second device 204 (e.g., unit 101 in FIG. 1). In this case, second reference information 748 is composed of the nominal position of the third device 706 (unit 102) relative to the first device 702 (unit 100) and a nominal relative velocity and attitude of the third position 107 (FIG. 1) relative to the first position 103. The second processing unit 726 determines the relative navigation solution information 745 of the third device 706 relative to the first device 702, and generates resets 750 and 752 as a function of the relative navigation solution information 745 and the second reference information 748.

The first device 702 (e.g., unit 100) and the third device 706 (e.g., unit 102) communicate via a wireless or wired connection with the second processing unit 726. The second relative navigation algorithm 744 is communicatively coupled to the second data fusion algorithm 746 to allow input and output signal flow between the second relative navigation algorithm 744 and the second data fusion algorithm 746. The second relative navigation algorithm 744 is also communicatively coupled to the second sensor compensation algorithm 742 to allow input and output signal flow between the two units involved.

Again, as also illustrated by system 700 in FIGS. 7A and 7B, a plurality of inertial sensor unit pairs may be utilized in any given application. For example, system 700 includes a first pair of inertial sensor units 708 and 710, and a second pair of inertial sensor units 708 and 712. The plurality of inertial sensor units 708, 710 and 712 are each located at a related position, and each is configured to generate sensor information that is responsive to a motion of the respective device 702, 704 and 706 involved. Each of the devices 704 and 706 is located at a position nominally offset from the location of the first device 702 at the first position by a respective nominal lever-arm 714 and 716. Each of the devices 704 and 706 forms a respective pair of devices with first device 702.

Each of the relative navigation algorithms 730 and 744 in the respective processing units 724 and 726 is associated with a respective pair of devices 702 to 704 and 702 to 706. Each relative navigation algorithm 730 and 744 is configured to generate relative states of a relative navigation solution for each pair of devices 702 to 704 and 702 to 706. Each of the plurality of data fusion algorithms 732 and 746 in the respective processing units 724 and 726 is associated with a respective one of the plurality of relative navigation algorithms 730 and 744, and a respective pair of devices 702 to 704 and 702 to 706. Each data fusion algorithm 732 and 746 generates respective resets 738 and 750 to the relative states of the respective relative navigation solution 731 and 745 for each respective pair of devices 702 to 704 and 702 to 706. The relative navigation solutions 731 and 745 are provided as outputs for communication with the external system 736.

Figure 8:
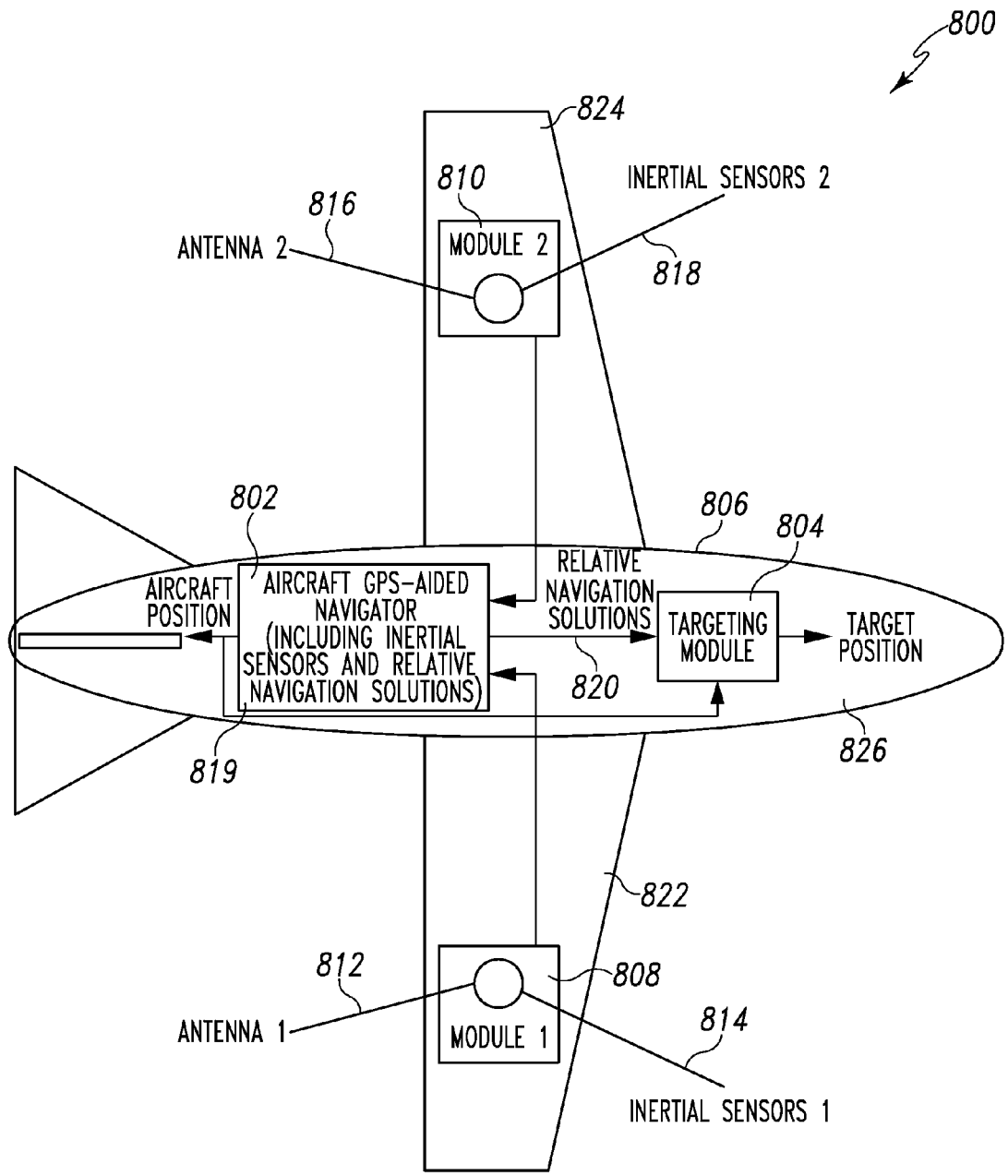
FIG. 8 depicts a pictorial diagram that represents another example relative navigation system, which can be used to implement one or more embodiments of the present invention.

FIG. 8 depicts a pictorial diagram that represents an example relative navigation system 800, which can be used to implement one or more embodiments of the present invention. For this illustrative example, system 800 may be used to implement an embodiment of system 700 depicted in FIGS. 7A and 7B. Thus, similar in design and function to system 600 depicted in FIG. 6, relative navigation system 800 includes an INS/GPS navigation system 802 for determining the position of airborne vehicle 806, and a targeting module 804 for determining the position of a target located in front of the airborne vehicle 806. Also, the airborne vehicle 806 may be an aircraft or space-borne vehicle in flight.

Note, however, that for this example implementation, system 800 is significantly different than system 600 shown in FIG. 6, because system 800 includes only one processing unit for determining relative navigation solution information 820, and that processing unit is co-located with the INS/GPS navigation system 802.

System 800 also includes a first module 808 and a second module 810. The first module 808 includes a first antenna unit 812 and a first set of inertial sensors 814. The second module 810 includes a second antenna unit 816 and a second set of inertial sensors 818. For example, the first antenna unit 812 and second antenna unit 816 may include GPS antennas or ESM antennas (or both). The first module 808 is located near an outboard edge of a first wing 822 of airborne vehicle 806, and the second module 810 is located near an outboard edge of a second wing 824. Also, note that a third set of inertial sensors 819 is located within the main body or fuselage 826 of the airborne vehicle 806. For example, the first module 808 may represent the second device 704 shown in FIG. 7B (plus the antenna unit 812), the second module 810 may represent the third device 706 in FIG. 7A (plus the antenna unit 816), and the third set of inertial sensors 819 may represent first device 702 in FIG. 7A. Therefore, in this case, system 800 includes three sets of inertial sensors located at different positions on the airborne vehicle involved, and one of the sets of inertial sensors is co-located with a relative navigation processing unit.

Thus, in this exemplary configuration, system 800 provides a centralized processing approach for obtaining high accuracy relative navigation solutions for the airborne systems involved. Using the relative motion information obtained from the two sets of inertial sensors 814 and 818 with respect to the inertial sensors 819 as input data, the INS/GPS navigation system 802 provides relative navigation solution information 820 (as aircraft position information) as an input to the targeting module 804. Consequently, the performance capabilities of both the INS/GPS navigation system 802 and targeting module 804 are enhanced over conventional relative navigation techniques that do not account for the platform flexing that occurs at the sensing locations of interest.

Figure 9A:
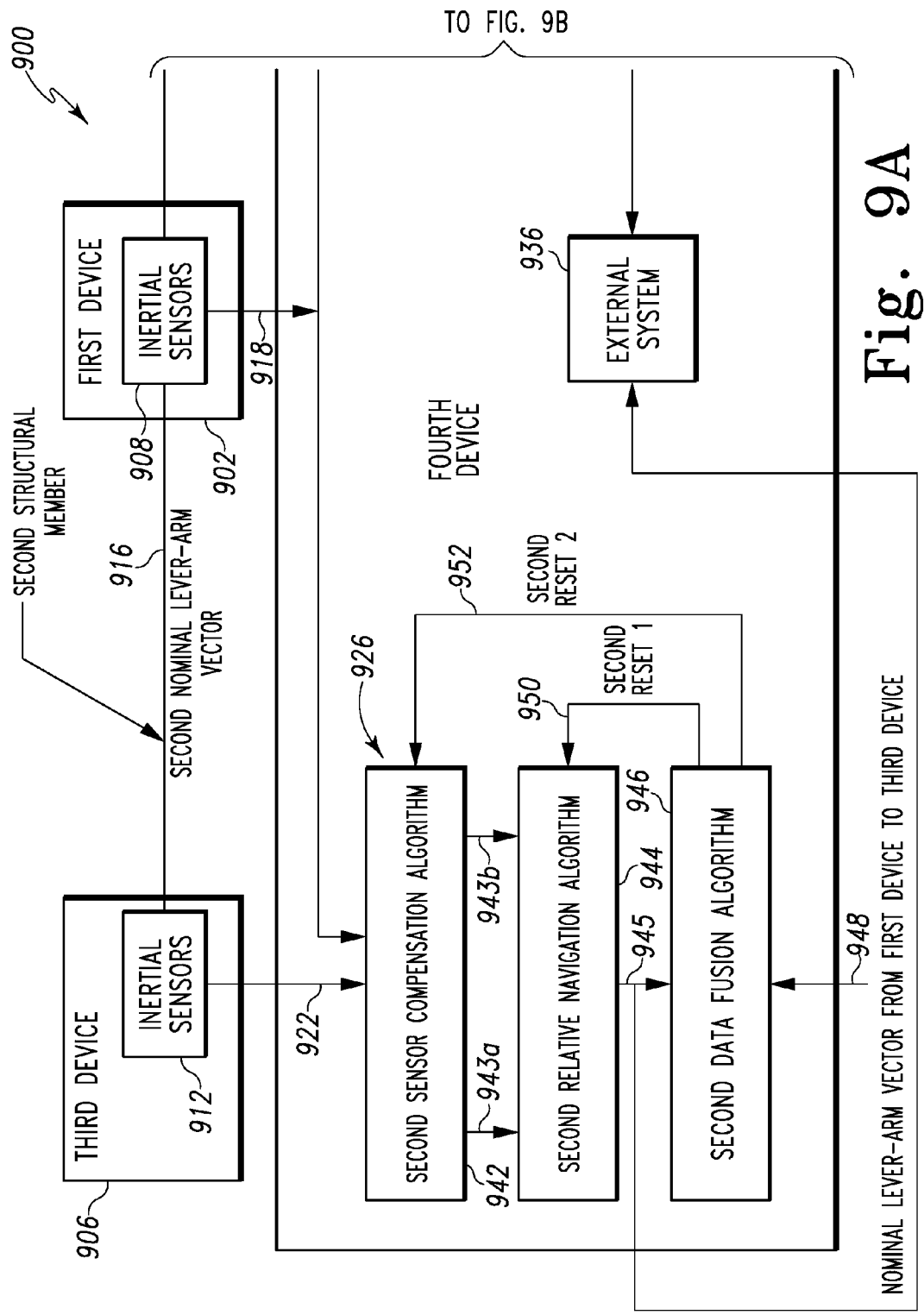
FIGS. 9A and 9B are block diagrams depicting an example configuration for yet another system that also includes three sets of sensors or IMUs, which can be used to implement one or more embodiments of the present invention.
Figure 9B:
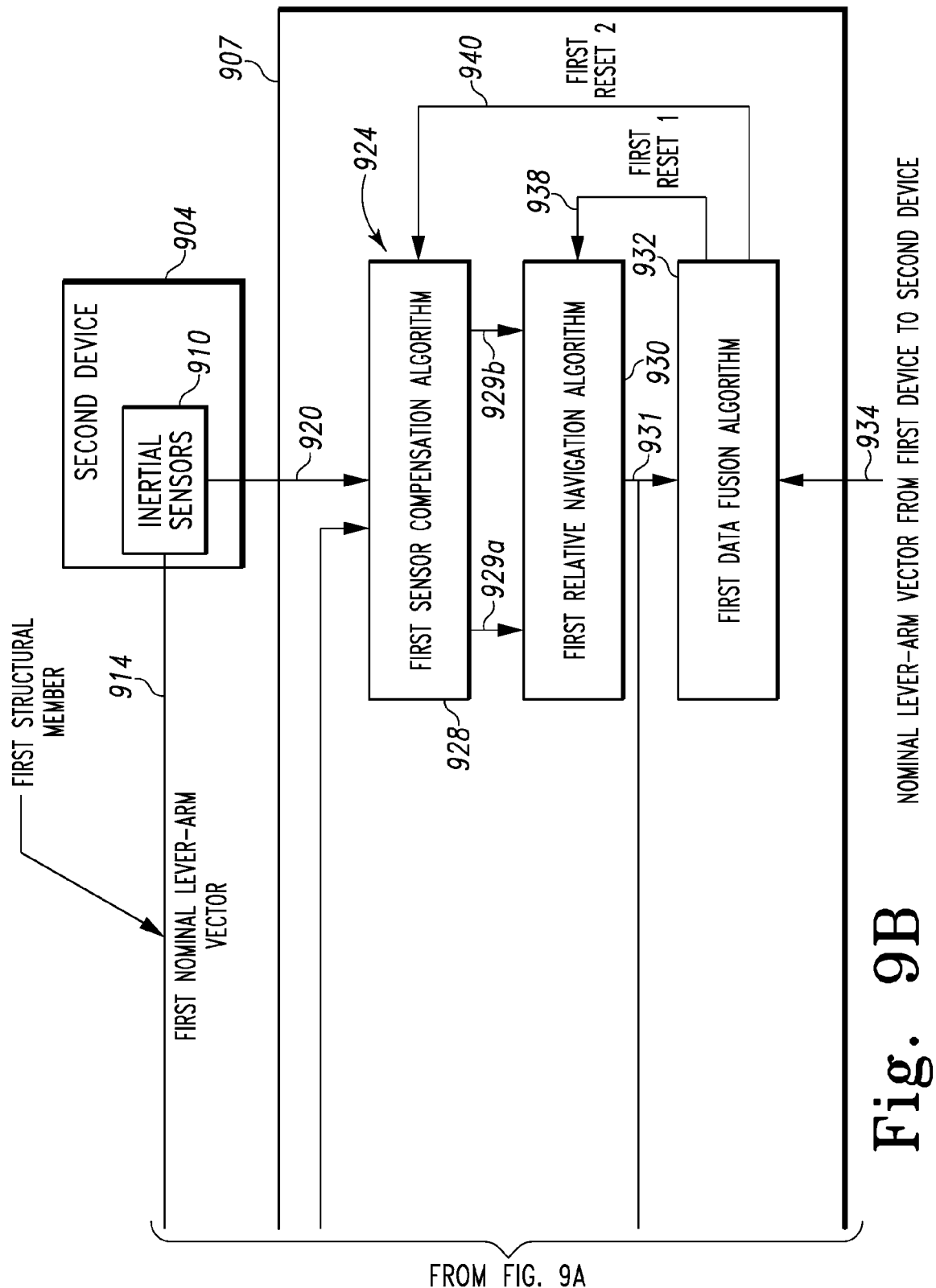

FIGS. 9A and 9B are block diagrams depicting an example configuration for a system 900 that also includes three IMUs (e.g., suites or sets of inertial sensors), which can be used to implement one or more embodiments of the present invention. Similar to system 700 described above with respect to FIGS. 7A and 7B, system 900 may be referred to as a "relative navigation system" or "relative motion measurement system". However, note that for this example implementation, system 900 is significantly different than the example implementation illustrated by system 700, because although system 900 includes three IMUs (or sets of inertial sensors) located at different positions, none of the three IMUs is co-located with a relative navigation solution processing unit.

For this example implementation, system 900 includes a first device 902, a second device 904, and third device 906, and a fourth device 907. Each of the three devices 902, 904 and 906 may be an IMU, and each device or IMU includes a respective set of inertial sensors 908, 910 and 912. For example, each device 902, 904 and 906, and the sets of inertial sensors 908, 910 and 912 (e.g., IMUs) may be configured as described above with respect to units 100, 101 and 102, respectively, shown in FIG. 1.

Notably, for this example implementation, the fourth device 907 includes a first processing unit (indicated generally by numeral 924) and a second processing unit (indicated generally by numeral 926). However, this implementation is not intended to be limited by the number of processing units involved. For example, the components and functions of the two processing units 924 and 926 may be combined and performed with a single processing unit. In any event, for this implementation, the first processing unit 924 includes a first sensor compensation algorithm 928, a first relative navigation algorithm 930, and a first data fusion algorithm 932. Second processing unit 926 includes a second sensor compensation algorithm 942, a second relative navigation algorithm 944, and a second data fusion algorithm 946. Notably, for at least this example implementation, the design and functions of the components of first processing unit 924 and second processing unit 926 are deemed virtually identical.

The first set of inertial sensors 908 is configured to convey (e.g., transmit, broadcast, etc.) the first sensor data 918 to the first sensor compensation algorithm 928 and the second sensor compensation algorithm 942. The second set of inertial sensors 910 is configured to convey (e.g., transmit, broadcast, etc.) the second sensor data 920 to the first sensor compensation algorithm 928, and the third set of inertial sensors 912 is configured to convey (e.g., transmit, broadcast, etc.) the third sensor data 922 to the second sensor compensation algorithm 942.

Again, the relative motion between the first device 902 and the third device 906 is obtained in a manner similar to that described above with respect to determining the relative motion between the first device 202 (e.g., unit 100 in FIG. 1) and second device 204 (e.g., unit 101 in FIG. 1) in FIG. 2. In this case, second reference information 948 is composed of the nominal position of the third device 906 (unit 102) relative to the first device 902 (unit 100) and a nominal relative velocity and attitude of the third position 107 (FIG. 1) relative to the first position 103. The second processing unit 926 determines the relative navigation solution information 945 of the third device 906 relative to the first device 902, and generates resets 950 and 952 as a function of the relative navigation solution information 945 and the second reference information 948.

The first device 902 (e.g., unit 100) and the third device 906 (e.g., unit 102) communicate via a wireless or wired connection with the second processing unit 926. The second relative navigation algorithm 944 is communicatively coupled to the second data fusion algorithm 946 to allow input and output signal flow between the second relative navigation algorithm 944 and the second data fusion algorithm 946. The second relative navigation algorithm 944 is also communicatively coupled to the second sensor compensation algorithm 942 to allow input and output signal flow between the two units involved.

Again, also as illustrated by system 900 in FIGS. 9A and 9B, a plurality of inertial sensor unit pairs may be utilized in any given application. For example, system 900 includes a first pair of inertial sensor units 908 and 910, and a second pair of inertial sensor units 908 and 912. The plurality of inertial sensor units 908, 910 and 912 are each located at a related position, and each is configured to generate sensor information that is responsive to a motion of the respective device 902, 904 and 906 involved. Each of the devices 904 and 906 is located at a position nominally offset from the location of the first device 902 at the first position by a respective nominal lever-arm 914 and 916. Each of the devices 904 and 906 forms a respective pair of devices with first device 902.

Each of the relative navigation algorithms 930 and 944 in the respective processing units 924 and 926 is associated with a respective pair of devices 902 to 904 and 902 to 906. Each relative navigation algorithm 930 and 944 is configured to generate relative states of a relative navigation solution for each pair of devices 902 to 904 and 902 to 906. Each of the plurality of data fusion algorithms 932 and 946 in the respective processing units 924 and 926 is associated with a respective one of the plurality of relative navigation algorithms 930 and 944, and a respective pair of devices 902 to 904 and 902 to 906. Each data fusion algorithm 932 and 946 generates respective resets 938 and 950 to the relative states of the respective relative navigation solution 931 and 945 for each respective pair of devices 902 to 904 and 902 to 906. Also, each data fusion algorithm 932 and 946 generates respective device resets 940 and 952 that provide corrective feedback to the first sensor compensation algorithm 928 and second sensor compensation algorithm 942 in order to control errors in the combination of data from the first device 902 and the second device 904 or the third device 906. The relative navigation solutions 931 and 945 are provided as outputs for communication with the external system 936.

Figure 10:
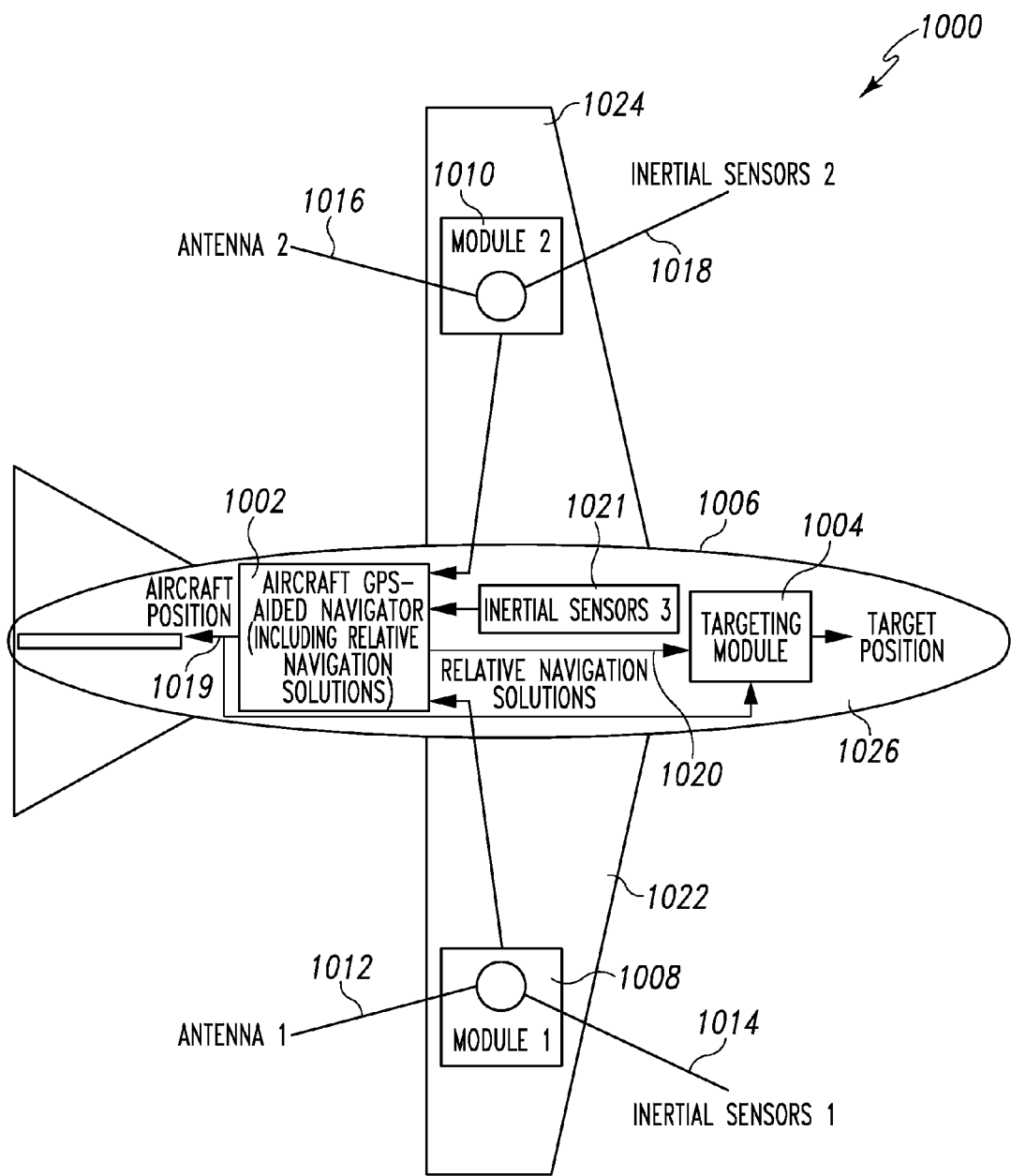
FIG. 10 depicts a pictorial diagram that represents yet another example relative navigation system, which can be used to implement one or more embodiments of the present invention.

FIG. 10 depicts a pictorial diagram that represents an example relative navigation system 1000, which can be used to implement one or more embodiments of the present invention. For this illustrative example, system 1000 may be used to implement an embodiment of system 900 depicted in FIGS. 9A and 9B. Thus, similar in design and function to system 800 depicted in FIG. 8, relative navigation system 1000 includes an INS/GPS 1002 for determining the navigation solution of airborne vehicle 1006 and a targeting module 1004 for determining the position of a target located in front of the airborne vehicle 1006. Also, the airborne vehicle 1006 may be an aircraft or space-borne vehicle in flight.

Note, however, that for this example implementation, system 1000 is significantly different than system 800 shown in FIG. 8, because system 1000 includes a fourth device including two processing units for determining relative navigation solution information 1020, the two processing units are co-located with the INS/GPS 1002, the INS/GPS 1002 is located in the body or fuselage 1026 of the airborne vehicle 1006, and one of the remaining three devices is also located in the body or fuselage of the airborne vehicle.

System 1000 also includes a first module 1008 and a second module 1010. The first module 1008 includes a first antenna unit 1012 and a first set of inertial sensors 1014. The second module 1010 includes a second antenna unit 1016 and a second set of inertial sensors 1018. For example, the first antenna unit 1012 and second antenna unit 1016 may include GPS antennas or Electronic Support Measures (ESM) antennas (or other types of antennas). The first module 1008 is located near an outboard edge of a first wing 1022 of airborne vehicle 1006, and the second module 1010 is located near an outboard edge of a second wing 1024. Also, note that the third set of inertial sensors 1021 is located within the main body or fuselage 1026 of the airborne vehicle 1006. For example, the first module 1008 may represent the second device 904 shown in FIG. 9B (plus the antenna unit 1012), the second module 1010 may represent the third device 906 in FIG. 9A (plus the antenna unit 1016), and the third set of inertial sensors 1021 may represent first device 902 in FIG. 9A. Therefore, in this case, system 1000 includes three sets of inertial sensors located at different positions on the airborne vehicle involved, and none of the sets of inertial sensors is co-located with a relative navigation processing unit.

Thus, in this exemplary configuration, system 1000 provides a distributed approach for obtaining high accuracy relative navigation solutions for the airborne systems involved. Using the relative motion information obtained from the two sets of inertial sensors 1014 and 1018 with respect to the inertial sensors 1021 as input data, the INS/GPS 1002 provides relative navigation solution information 1020 as an input to the targeting module 1004. Consequently, the performance capabilities of both the INS/GPS 1002 and targeting module 1004 are enhanced over conventional techniques that do not account for the platform flexing that occurs at the sensing locations of interest.

Figure 11A:
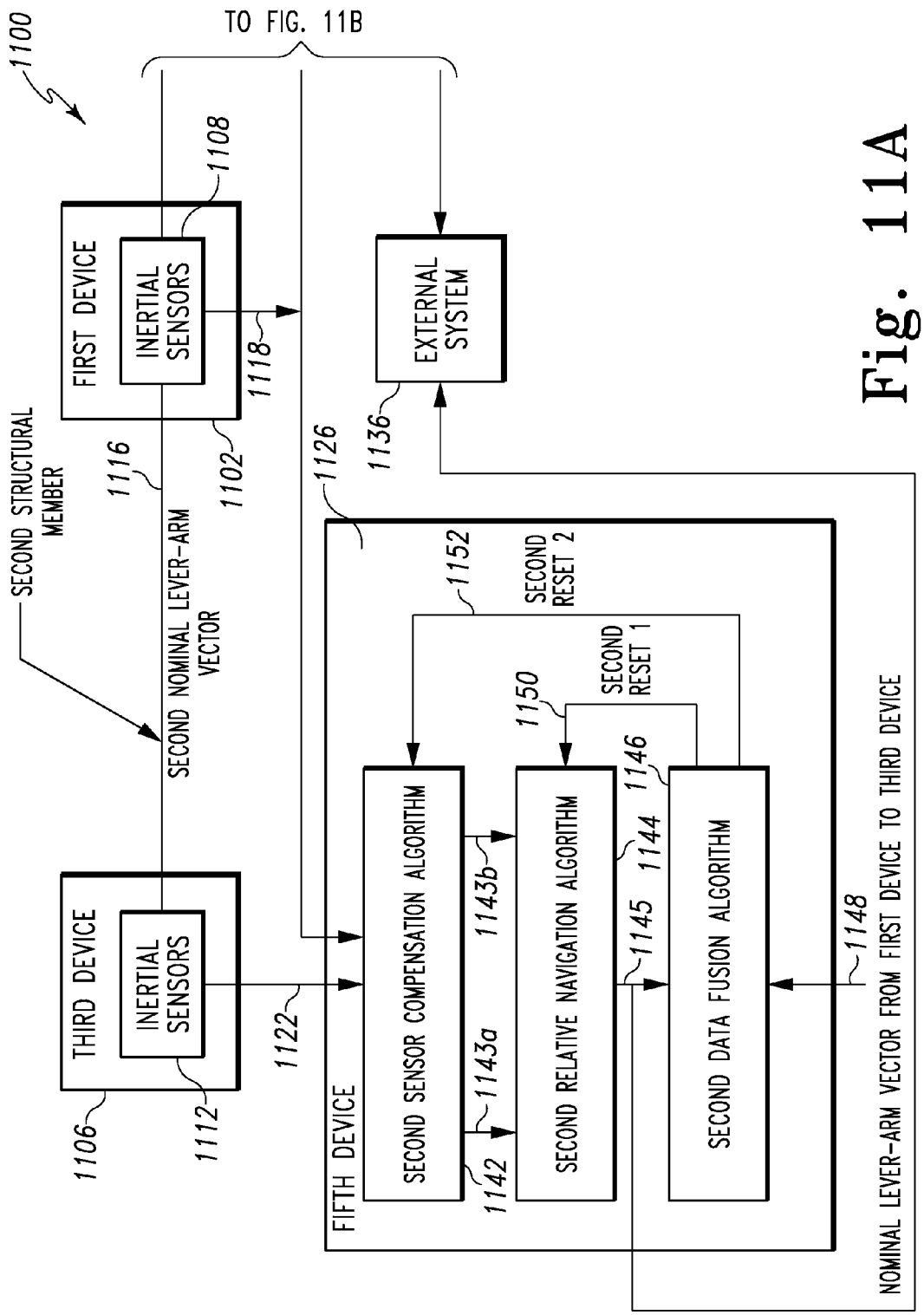
FIGS. 11A and 11B are block diagrams depicting still another example configuration for a system that also includes three sets of sensors or IMUs, which can be used to implement one or more embodiments of the present invention.
Figure 11B:
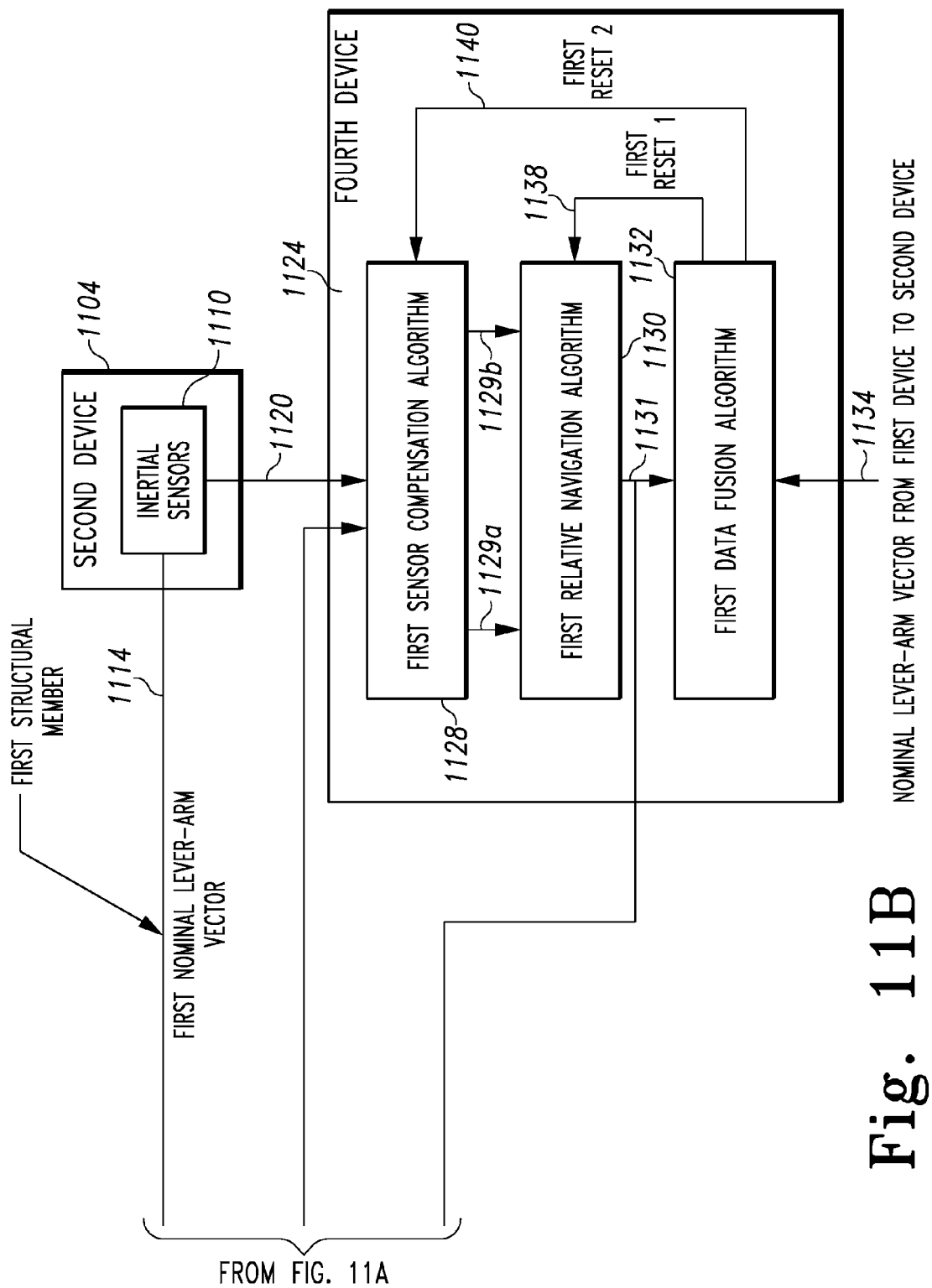

FIGS. 11A and 11B are block diagrams depicting an example configuration for a system 1100 that also includes three IMUs (e.g., suites or sets of inertial sensors), which can be used to implement one or more embodiments of the present invention. System 1100 may be referred to as a "relative navigation system" or "relative motion measurement system". Note that system 1100 is significantly different than the example implementation illustrated by system 900 depicted in FIGS. 9A and 9B, because although system 1100 includes three IMUs (or sets of inertial sensors) located at different positions, none of the three IMUs is co-located with a relative navigation solution processing unit. However, system 1100 provides a physically separate relative navigation processing unit for each of the IMUs involved.

Specifically, for this example implementation, system 1100 includes a first device 1102, a second device 1104, a third device 1106, a fourth device 1124, and a fifth device 1126. Each of the three devices 1102, 1104 and 1106 may be an IMU, and each such device or IMU includes a respective set of inertial sensors 1108, 1110 and 1112. For example, each device 1102, 1104 and 1106, and the sets of inertial sensors 1108, 1110 and 1112 (e.g., IMUs) may be configured as described above with respect to units 100, 101 and 102, respectively, shown in FIG. 1.

Notably, for this example implementation, the fourth device 1124 includes the component elements of a first relative navigation processing unit, and the fifth device 1126 includes the component elements of a second relative navigation processing unit. Specifically, the first relative navigation processing unit (1124) includes a first sensor compensation algorithm 1128, a first relative navigation algorithm 1130, and a first data fusion algorithm 1132. The second relative navigation processing unit (1126) includes a second sensor compensation algorithm 1142, a second relative navigation algorithm 1144, and a second data fusion algorithm 1146. Notably, for at least this example implementation, the design and functions of the components of first relative navigation processing unit and second relative navigation processing unit are deemed virtually identical.

The first set of inertial sensors 1108 is configured to convey (e.g., transmit, broadcast, etc.) the first sensor data 1118 to the first sensor compensation algorithm 1128 and the second sensor compensation algorithm 1142. The second set of inertial sensors 1110 is configured to convey (e.g., transmit, broadcast, etc.) the second sensor data 1120 to the first sensor compensation algorithm 1128, and the third set of inertial sensors 1112 is configured to convey (e.g., transmit, broadcast, etc.) the third sensor data 1122 to the second sensor compensation algorithm 1142.

Once again, the relative motion between the first device 1102 and the third device 1106 may be obtained in a manner similar to that described above with respect to determining the relative motion between the first device 202 (e.g., unit 100 in FIG. 1) and second device 204 (e.g., unit 101 in FIG. 1) in FIG. 2. In this case, the second reference information 1148 is composed of the nominal position of the third device 1106 (unit 102) relative to the first device 1102 (unit 100), and a nominal relative attitude of the third position 107 (FIG. 1) relative to the first position 103. The second relative navigation processing unit 1126 determines the relative navigation solution information 1145 of the third device 1106 relative to the first device 1102, and generates resets 1150 and 1152 as a function of the relative navigation solution information 1145 and the second reference information 1148.

The first device 1102 (e.g., unit 100) and the third device 1106 (e.g., unit 102) communicate via a wireless or wired connection with the second relative navigation processing unit 1126. The second relative navigation algorithm 1144 is communicatively coupled to the second data fusion algorithm 1146 to allow input and output signal flow between the second relative navigation algorithm 1144 and the second data fusion algorithm 1146. The second relative navigation algorithm 1144 is also communicatively coupled to the second sensor compensation algorithm 1142 to allow input and output signal flow between the two units involved.

Again, also as illustrated by system 1100 in FIGS. 11A and 11B, a plurality of inertial sensor unit pairs may be utilized in any given application. For example, system 1100 includes a first pair of inertial sensor units 1108 and 1110, and a second pair of inertial sensor units 1108 and 1112. The plurality of inertial sensor units 1108, 1110 and 1112 are each located at a related position, and each is configured to generate sensor information that is responsive to a motion of the respective device 1102, 1104 and 1106 involved. Each of the devices 1104 and 1106 is located at a position nominally offset from the location of the first device 1102 at the first position by a respective nominal lever-arm 1114 and 1116. Each of the devices 1104 and 1106 forms a respective pair of devices with the first device 1102.

Each of the relative navigation algorithms 1130 and 1144 in the respective relative navigation processing units 1124 and 1126 is associated with a respective pair of devices 1102 to 1104 and 1102 to 1106. Each relative navigation algorithm 1130 and 1144 is configured to generate relative states of a relative navigation solution for each pair of devices 1102 to 1104 and 1102 to 1106. Each of the plurality of data fusion algorithms 1132 and 1146 in the respective relative navigation processing units 1124 and 1126 is associated with a respective one of the plurality of relative navigation algorithms 1130 and 1144, and a respective pair of devices 1102 to 1104 and 1102 to 1106. Each data fusion algorithm 1132 and 1146 generates respective resets 1138 and 1150 to the relative states of the respective relative navigation solution 1131 and 1145 for each respective pair of devices 1102 to 1104 and 1102 to 1106. Also, each data fusion algorithm 1132 and 1146 generates respective device resets 1140 and 1152 that provide corrective feedback to the first sensor compensation algorithm 1128 and second sensor compensation algorithm 1142 in order to control errors in the combination of data from the different devices 1102, 1104, 1106, 1124 and 1126. The relative navigation solutions 1131 and 1145 are provided as outputs for communication with the external system 1136.

Figure 12:
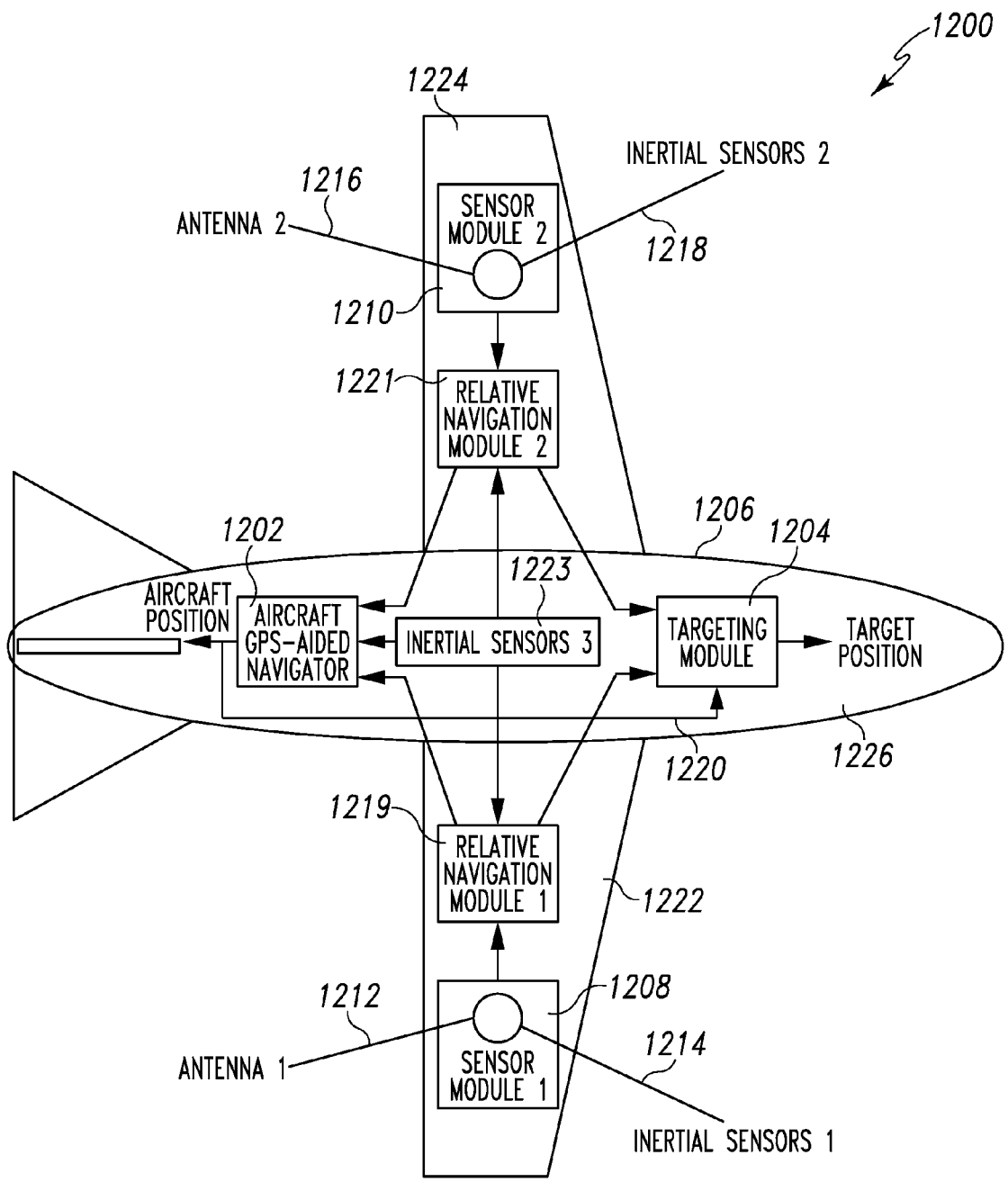
FIG. 12 depicts a pictorial diagram that represents still another example relative navigation system, which can be used to implement one or more embodiments of the present invention.

FIG. 12 depicts a pictorial diagram that represents an example relative navigation system 1200, which can be used to implement one or more embodiments of the present invention. For this illustrative example, system 1200 may be used to implement an embodiment of system 1100 depicted in FIGS. 11A and 11B. Specifically, relative navigation system 1200 includes an INS/GPS 1202 for determining the navigation solution of an airborne vehicle 1206 and a targeting module 1204 for determining the position of a target located in front of the airborne vehicle 1206. For example, the airborne vehicle 1206 may be an aircraft or space-borne vehicle in flight.

Note that for this example implementation, system 1200 is significantly different than system 1000 shown in FIG. 10, because although system 1200 includes two relative navigation processing units 1219 and 1221 for determining separate relative navigation solutions, the two relative navigation processing units 1219 and 1221 are not co-located with either the INS/GPS 1202 or the sets of inertial sensors (e.g., IMUs) 1208 and 1210.

For example, system 1200 includes a first sensor module 1208 and a second sensor module 1210. The first sensor module 1208 includes a first antenna unit 1212 and a first set of inertial sensors 1214. The second sensor module 1210 includes a second antenna unit 1216 and a second set of inertial sensors 1218. For example, the first antenna unit 1212 and second antenna unit 1216 may include GPS antennas, ESM antennas (or both), or other types of antennas. The first sensor module 1208 is located near an outboard edge of a first wing 1222 of airborne vehicle 1206, and the second sensor module 1210 is located near an outboard edge of a second wing 1224. The first relative navigation processing unit 1219 is located on the first wing 1222 at a different position than the first sensor module 1208, and the second relative navigation processing unit 1221 is located on the second wing 1224 at a different position than the second sensor module 1210. A third set of inertial sensors 1223 is located within the main body or fuselage 1226 of the airborne vehicle 1206. For example, the first module 1208 may represent the second device 1104 shown in FIG. 11B (plus the antenna unit 1212), the second module 1210 may represent the third device 1106 in FIG. 11A (plus the antenna unit 1216), and the third set of inertial sensors 1223 may represent first device 1102 in FIG. 11A. Therefore, in this case, system 1200 includes three sets of inertial sensors located at different positions on the airborne vehicle involved, and none of the sets of inertial sensors is co-located with a relative navigation processing unit.

Thus, in this exemplary configuration, system 1200 provides a distributed processing approach for obtaining high accuracy relative navigation solutions for the airborne systems involved. Using the relative motion information obtained from the two sets of inertial sensors 1214 and 1218 with respect to the inertial sensors 1223 as input data to the respective relative navigation processing unit 1219 and 1221, each one of the relative navigation processing units 1219 and 1221 provides relative navigation solution information as inputs to both the INS/GPS 1202 and the targeting module 1204. Consequently, the performance capabilities of both the INS/GPS 1202 and targeting module 1204 are enhanced over conventional techniques that do not account for the platform flexing that occurs at the sensing locations of interest.

It is important to note that while the present invention has been described in the context of a fully functioning navigation system and method, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular navigation system and method.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A relative navigation system, comprising:
 a first sensor unit responsive to a motion of a first position;
 a second sensor unit responsive to a motion of a second position; and
 a first processing unit associated with at least one of the first sensor unit and the second sensor unit and communicatively coupled to the first sensor unit and the second sensor unit, wherein the first processing unit is configured to generate relative navigation solution information associated with first sensor unit information and second sensor unit information.

2. The relative navigation system of claim 1, further comprising:
 a third sensor unit responsive to a motion of a third position; and
 a second processing unit associated with the third sensor unit and communicatively coupled to the third sensor unit and at least one of the first sensor unit and the second sensor unit, wherein the second processing unit is configured to generate relative navigation solution information associated with third sensor unit information and at least one of the first sensor unit information and the second sensor unit information.

3. The relative navigation system of claim 1, further comprising:
 a third sensor unit responsive to a motion of a third position; and
 a second processing unit associated with the first processing unit and at least one of the first sensor unit and the second sensor unit, and communicatively coupled to the third sensor unit and at least one of the first sensor unit and the second sensor unit, wherein the second processing unit is configured to generate relative navigation solution information associated with third sensor unit information and at least one of the first sensor unit information and the second sensor unit information.

4. The relative navigation system of claim 1, further comprising:
 a third sensor unit responsive to a motion of a third position; and
 a second processing unit associated with the first processing unit, and communicatively coupled to the third sensor unit and at least one of the first sensor unit and the second sensor unit, wherein the second processing unit is configured to generate relative navigation solution information associated with third sensor unit information and at least one of the first sensor unit information and the second sensor unit information.

5. The relative navigation system of claim 1, further comprising:
 a third sensor unit responsive to a motion of a third position; and
 a second processing unit not co-located with the first processing unit, the first sensor unit, the second sensor unit, or the third sensor unit, the second processing unit communicatively coupled to the third sensor unit and at least one of the first sensor unit and the second sensor unit, wherein the second processing unit is configured to generate relative navigation solution information associated with third sensor unit information and at least one of the first sensor unit information and the second sensor unit information.

6. The relative navigation system of claim 1, wherein the first sensor unit includes a first plurality of inertial sensors, and the second sensor unit includes a second plurality of inertial sensors.

7. The relative navigation system of claim 1, wherein the first sensor unit comprises a first IMU, and the second sensor unit comprises a second IMU.

8. The relative navigation system of claim 1, wherein at least one of the first sensor unit and the second sensor unit is substantially co-located with a radio-frequency antenna.

9. The relative navigation system of claim 1, wherein the first processing unit is configured to execute at least one of a sensor compensation algorithm, a relative navigation algorithm, and a data fusion algorithm.

10. The relative navigation system of claim 1, wherein at least one of the first sensor unit, the second sensor unit, and the first processing unit is substantially co-located with an INS/GPS.

11. A relative navigation system, comprising:
a first inertial measurement unit located at a first wing of a craft;
a second inertial measurement unit located at a main body or a second wing of the craft; and
a first processing unit associated with the first inertial measurement unit and communicatively coupled to the first inertial measurement unit and the second inertial measurement unit, the first processing unit including at least a first relative navigation algorithm for generating a first relative navigation solution.

12. The relative navigation system of claim 11, further comprising:
a second processing unit associated with the second inertial measurement unit further located at the second wing of the craft in flight and communicatively coupled to the first inertial measurement unit and the second inertial measurement unit, the second processing unit including at least a second relative navigation algorithm for generating a second relative navigation solution.

13. The relative navigation system of claim 11, further comprising:
at least one of a GPS antenna and an ESM antenna substantially co-located with the first inertial measurement unit.

14. The relative navigation system of claim 11, wherein the first processing unit is configured to execute at least one of a sensor compensation algorithm, a relative navigation algorithm, a data fusion algorithm, and a Kalman filter.

15. A relative navigation method, comprising the steps of:
positioning a first sensor unit and a relative navigation processing unit at a first location on a craft;
positioning a second sensor unit at a second location on the craft;
receiving first sensor information from the first sensor unit;
receiving second sensor information from the second sensor unit;
generating compensated sensor information from the received first sensor information and second sensor information;
generating relative navigation solution information associated as a function of the compensated sensor information;
receiving baseline information; and
generating corrective feedback information as a function of at least the relative navigation solution information and the baseline information.

16. The method of claim 15, further comprising the step of outputting the relative navigation solution information to a navigation system.

17. The method of claim 15, wherein the generating corrective feedback information step is performed with a Kalman filter.

18. The method of claim 15, wherein the corrective feedback information includes a plurality of sensor compensation coefficients.

19. The method of claim 15, wherein the generating corrective feedback information step includes generating correction information for sensor compensation coefficients and relative navigation solution variables using a nominal sensor relative displacement vector.

20. The method of claim 15, wherein the baseline information is indicative of at least one of a nominal position of the second sensor unit relative to a nominal position of the first sensor unit and a nominal relative velocity and attitude of the second sensor unit relative to the first sensor unit.

* * * * *